(12) United States Patent
Shibuya et al.

(10) Patent No.: US 6,340,251 B1
(45) Date of Patent: Jan. 22, 2002

(54) MULTI-CHANNEL OPTICAL COUPLING MODULE

(75) Inventors: Yoshiki Shibuya; Takashi Ushikubo, both of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/253,740

(22) Filed: Feb. 22, 1999

(30) Foreign Application Priority Data

Feb. 23, 1998 (JP) .......................................... 10-059034
Sep. 24, 1998 (JP) .......................................... 10-269909

(51) Int. Cl.[7] ................................................ G02B 6/36
(52) U.S. Cl. ............................. 385/89; 385/91; 385/92; 385/34; 385/120
(58) Field of Search ............................. 385/31, 33, 34, 385/35, 89, 90, 91, 92, 93, 114, 120

(56) References Cited

U.S. PATENT DOCUMENTS

| | | | | |
|---|---|---|---|---|
| 4,948,214 A | * | 8/1990 | Hamblen | |
| 5,093,879 A | * | 3/1992 | Bregman et al. | ............. 385/93 |
| 5,260,587 A | * | 11/1993 | Sato | ............. 385/49 |
| 5,268,978 A | * | 12/1993 | Po et al. | ............. 385/33 |
| 5,502,457 A | * | 3/1996 | Sakai et al. | ............. 385/87 |
| 5,586,207 A | * | 12/1996 | Goodwin | ............. 385/92 |
| 5,903,694 A | * | 5/1999 | Sugawara | ............. 385/121 |
| 6,014,483 A | * | 1/2000 | Thual et al. | ............. 385/33 |

FOREIGN PATENT DOCUMENTS

| | | |
|---|---|---|
| JP | 5-88049 | 4/1993 |
| JP | 5-88050 | 4/1993 |

OTHER PUBLICATIONS

2D Self–Aligned Vertical–Cavity Surface–Emitting Laser Array Optical–Tramission Module, Hidoe Kosaka et al., Technical Report of IEICE, LQE96–144 (Feb. 1997), pp. 7–12.

* cited by examiner

*Primary Examiner*—Hemang Sanghavi
(74) *Attorney, Agent, or Firm*—Wenderoth, Lind & Ponack, L.L.P.

(57) ABSTRACT

An optical coupling module has an optical device and a fiber plate which propagates light that enters into the optical device or light that is emitted from the optical device. The optical device is fixed on a surface of a substrate of the optical coupling module. The fiber plate has multiple bundled optical fibers that are arranged in parallel with optical axes of the optical device.

23 Claims, 19 Drawing Sheets

MULTI-CHANNEL OPTICAL COUPLING MODULE

BACKGROUND OF THE INVENTION

1. Field of the Invention

The present invention relates to optical coupling modules, more particularly to optical coupling modules for coupling alight source with optical fibers for multi-channel optical communication.

2. Description of Related Art

Optical coupling modules are used to optically couple an optical device with optical fibers. Here, the term "optical device" refers not restrictively to a light emitting device (for example, a semiconductor laser), a light receiving device (for example, a photo diode), an optical function component (for example, an electric field absorption type optical modulation module), or the like.

The optical coupling modules disclosed in, for example, the Japanese Patent Application Laid-Open No. H5-88049 and the Japanese Patent Application Laid-Open No. H5-88050 are known.

The optical coupling modules disclosed in the Japanese Laid-Open Patent Application No. H5-88049 contains a lens array constructed by stacking up a pair of micro lens arrays. Each of the micro lens arrays is formed by installing multiple convex lenses that are separated from each other by a prescribed distance. This micro lens array optically couples multiple optical devices with multiple optical fibers.

The optical coupling modules disclosed in the Japanese Laid-Open Patent Application No. H5-88050 contains a substrate on which an aperture unit is formed. Multiple optical fibers are arranged and installed in this aperture unit.

In optically coupling an optical coupling module with optical fibers, the cores of the optical fibers need to be adjusted. An exemplary core adjustment method is described in Kosaka et al., "Surface Emission Laser Two Dimensional Array Core Unadjusted Packing Push-Pull Type Module", Shingaku Gihou LQE96-144, February 1997. As shown in this reference, it has been conventionally a standard practice to couple a multi-channel optical module with tape fibers via an optical connector. A positioning guide pin is formed in this optical connector.

However, the optical coupling module disclosed in the Japanese Laid-Open Patent Application No. H5-88049 requires an accurate core adjustment operation so as to match the optical axes of the micro lens array with the optical axes of the optical device. In order to tightly seal the optical device using the technique disclosed in the Japanese Laid-Open Patent Application No. H5-88050, the optical coupling module needs to be of a pig tail type. Unless a separate airtight window is installed between the optical fibers and the optical device, a receptacle type optical coupling module connectable to a connector cannot be realized.

Furthermore, in order to use the method disclosed in "Surface Emission Laser Two Dimensional Array Core Unadjusted Packing Push-Pull Type Module" by Kosaka and others, Shingaku Gihou LQE96-144, a high degree of alignment precision is required in aligning the optical device with the guide pin.

SUMMARY OF THE INVENTION

Given these problems, it is an object of the present invention to provide an optical coupling module having a high optical coupling efficiency, in which core adjustment operations can be easily performed on its fiber plate and micro lens array and the like.

It is another object of the present invention to provide an optical coupling module having a high optical coupling efficiency, in which optical fibers can be connected to a connector while tightly sealing the optical device.

According to the first aspect of this invention, the optical coupling module has an optical device fixed on a surface of a substrate and a fiber plate which propagates light that enters into the optical device or light that is emitted from the optical device. The fiber plate has multiple bundled optical fibers that are arranged in parallel with optical axes of the optical device.

According to another aspect of this invention, the optical coupling module has a light receiving device and a light emitting device that are fixed on the surface of the substrate and a lens array. This lens array propagates both light that enters into the light receiving device and light emitted from the light emitting device. The lens array aligns the optical axis of the incident light beams parallel with the optical axes of the emitted light beams in a region on an opposite side of the light receiving device or the light emitting device across the lens array by deflecting the incident light or emitted light.

According to still another aspect of this invention, the optical coupling module has an optical device fixed on the surface of the substrate and an image fiber which propagates light that enter into the optical device or lights that are emitted from the optical device. The image fiber has multiple bundled optical fibers that are arranged parallel to the optical axes of the optical device. In this aspect, the optical module is connected to an optical connector. This optical connector has a tape fiber having optical fiber wires that are installed parallel to the optical axes of the optical device corresponding to the light beams that enter into or are emitted from the optical device.

In the following embodiments, the image fiber is coupled with the tape fiber using a split sleeve. Moreover, a positioning guide pin is installed in the optical coupling module and the optical connector.

BRIEF DESCRIPTION OF THE DRAWINGS

FIG. 7(*b*) is a side view of the optical coupling module according to the variation of the first embodiment of the present invention.

DESCRIPTION OF THE PREFERRED EMBODIMENTS

Figure 1:
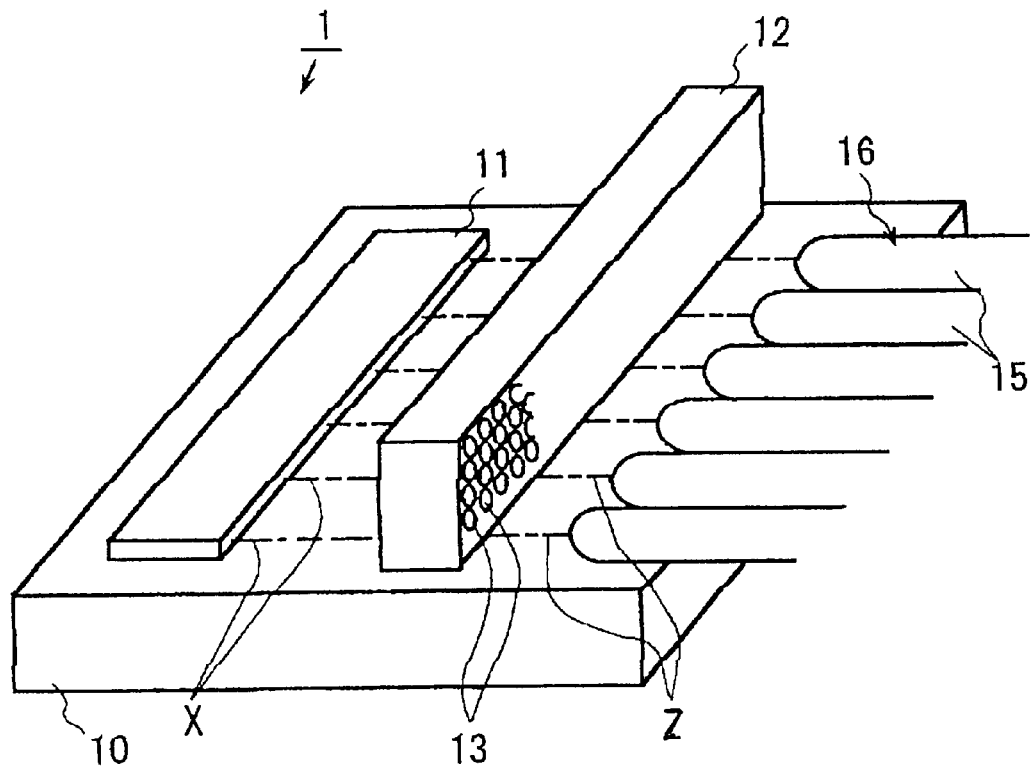
FIG. 1 is an oblique view showing an optical coupling module according to a first embodiment of the present invention.

In what follows, preferred embodiments of the present invention will be explained with reference to the attached drawings. FIG. 1 is an oblique view showing an optical coupling module 1 according to the first embodiment of the present invention. The substrate 10 is formed using, for example, silicon, ceramic, glass, or the like. In this embodiment, an end face output type semiconductor laser 11 as an optical device (light emitting device) and a fiber plate 12 (FOP: Fiber Optical Plate) are fixed on the surface of the substrate 10. The semiconductor laser 11 is fixed on the substrate 10 using solder or the like. The fiber plate 12 is fixed on the substrate 10 using a bond or the like.

The fiber plate 12 is constructed bundling multiple optical fibers 13. The optical axes of these optical fibers are parallel to the optical axes X of the light beam emitted in parallel from multiple positions separated by an equal distance on a side face of the semiconductor laser 11. In this embodiment, the multiple lights emitted from the semiconductor laser 11 are propagated outside via the optical fibers 13 that constitute the fiber plate 12, respectively.

A fiber ribbon 16 is installed on the surface of the substrate 10 at a position on the opposite side of the semiconductor laser 11 across the fiber plate 12. The fiber ribbon 16 is constructed arranging multiple optical fibers 15 in parallel. The optical axis Z of each of these optical fibers 15 that constitute the fiber ribbon 16 is aligned with the optical axis X of each the corresponding light beams emitted from the semiconductor laser 11. In FIG. 1, the optical axis X of the light emitted from the semiconductor laser 11 and the optical axis Z of each of these optical fibers 15 are indicated by one-point chain lines. In this way, the multiple light beams emitted from the semiconductor laser 11 pass through the fiber plate 12, and propagate outside via the optical fibers 15, respectively.

Figure 2:
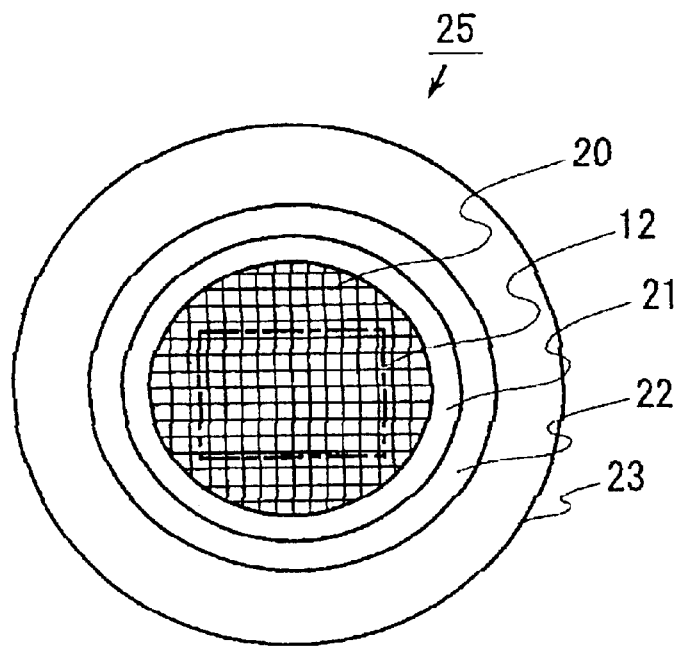
FIG. 2 is a cross sectional view of the image fiber.

Here, the fiber plate 12 can be constructed by cutting out only a pixel unit 20 (core) in the shape of a rectangular parallelepiped from the image guide 25. The image guide 25 is formed (for example, as shown in FIG. 2) by covering the pixel unit 20, which has been formed by bundling multiple optical fibers 13, with a quartz jacket 21, and covers 22 and 23.

Figure 3:
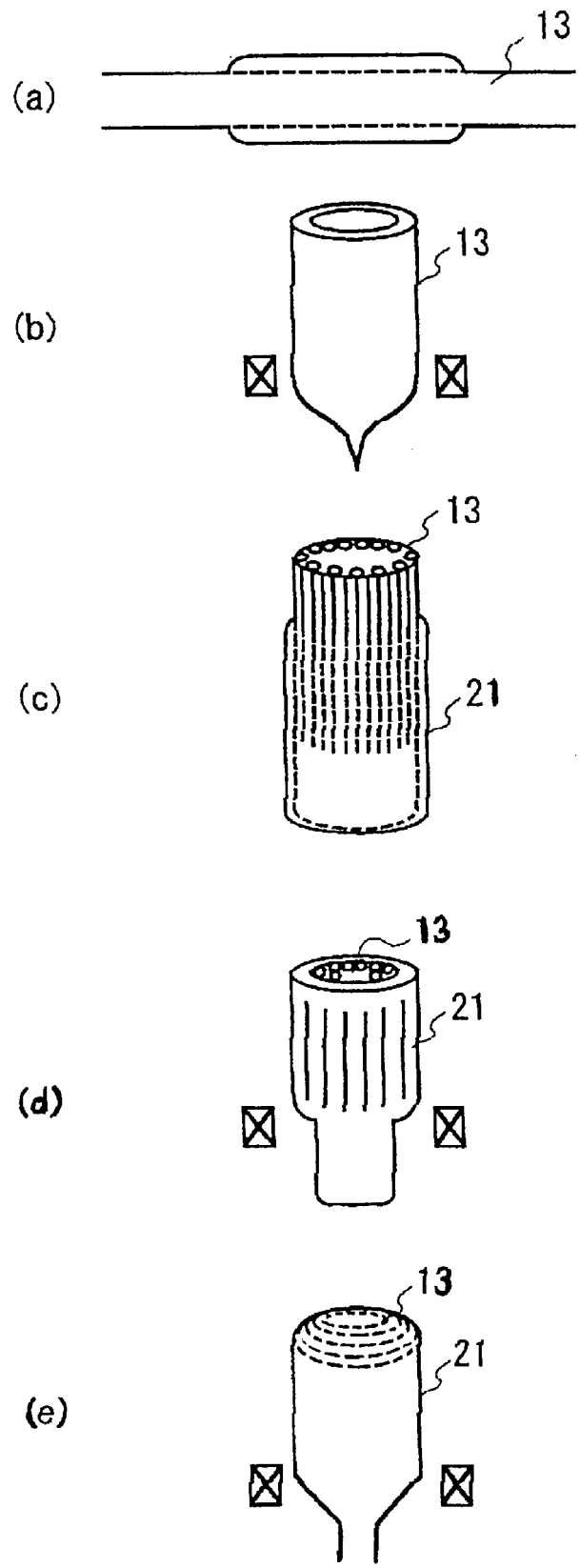
FIG. 3 explains the construction procedure of the image fiber.

In what follows, a method for constructing the image guide 25 will be explained with reference to FIG. 3. First, as shown in FIG. 3(a), optical fibers 13 for constituting the pixel unit 20 are constructed using a pre-form. Next, as shown in FIG. 3(b), each of these optical fibers 13 is drawn in the same manner as in the case in which standard optical fibers are manufactured. Next, as shown in FIG. 3(c), the multiple optical fibers 13 are bundled and stored inside a quartz jacket 21, and then a pre-form is created as shown in FIG. 3(d). Next, as shown in FIG. 3(e), the totality of the optical fibers 13 and the quartz jacket 21 are heated and line-drawing is performed while keeping the optical fibers 13 stored inside the quartz-jacket 21.

The thickness of each of the optical fibers 13 that constitute the pixel unit 20 stored inside the quartz jacket 21 after the line drawing, which is determined by the number of optical fibers 13 stored inside the quartz jacket 21 and the diameter of the image guide, is approximately between 10 $\mu$m and 40 $\mu$m. By cutting out the pixel unit 20 in the shape of a rectangular parallelepiped from thus manufactured image guide 25, a fiber plate 12 constituted of multiple optical fibers 13 bundled in parallel can be manufactured.

Figure 4:
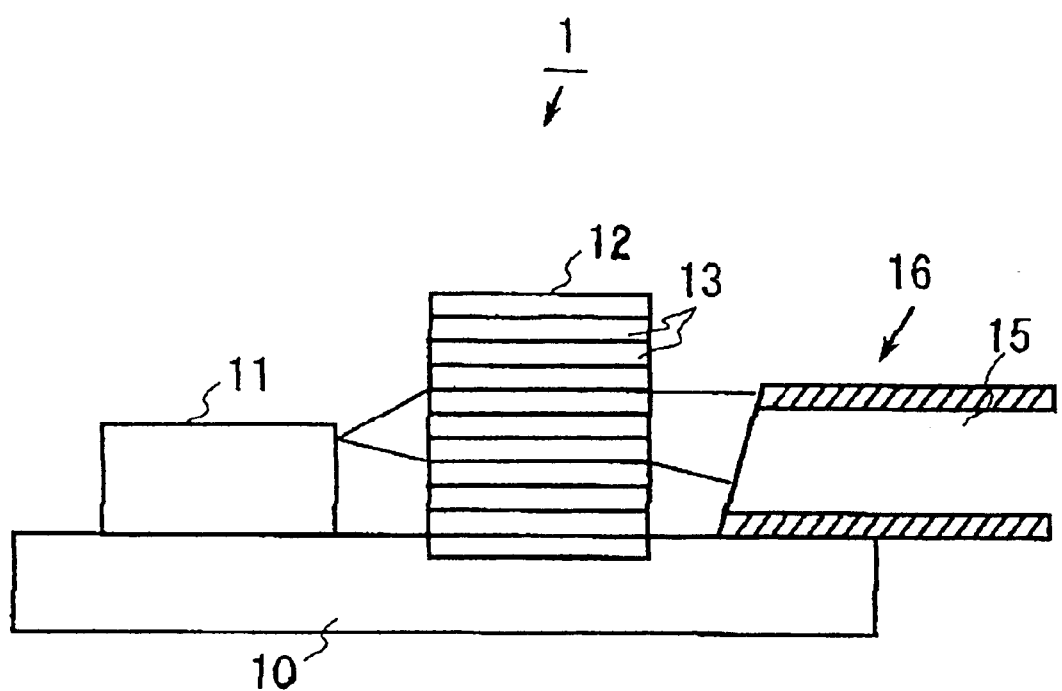
FIG. 4 explains the state of propagation of the light that propagates through the fiber plate.

As shown in FIG. 4, each of the light beams emitted from the semiconductor laser 11 reaches the fiber plate 12, propagates through corresponding optical fibers 13 that constitute the fiber plate 12, and is emitted outside the fiber plate 12. The light beam that has gone beyond the fiber plate 12 then reaches the optical fibers 15. Finally, these light beams propagate through the optical fibers 15.

Therefore, according to the optical coupling module of the first embodiment, the spot size of each of the optical fibers 15 can be made equal to the spot size of the corresponding one of the light beams that enter the optical fibers 15. As a result, the coupling efficiency can be improved in comparison with the conventional optical coupling module.

Figure 5:
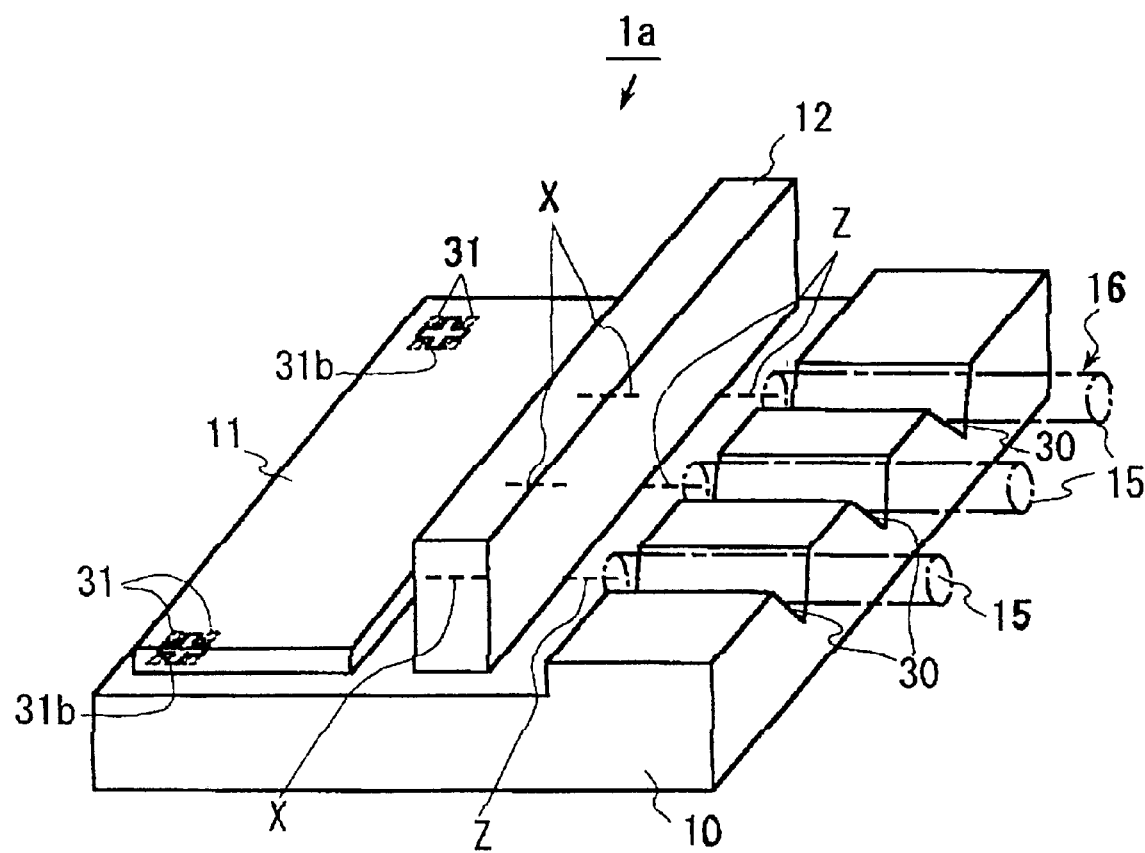
FIG. 5 is an oblique view of an optical coupling module according to a variation of the first embodiment of the present invention.
Figure 6:
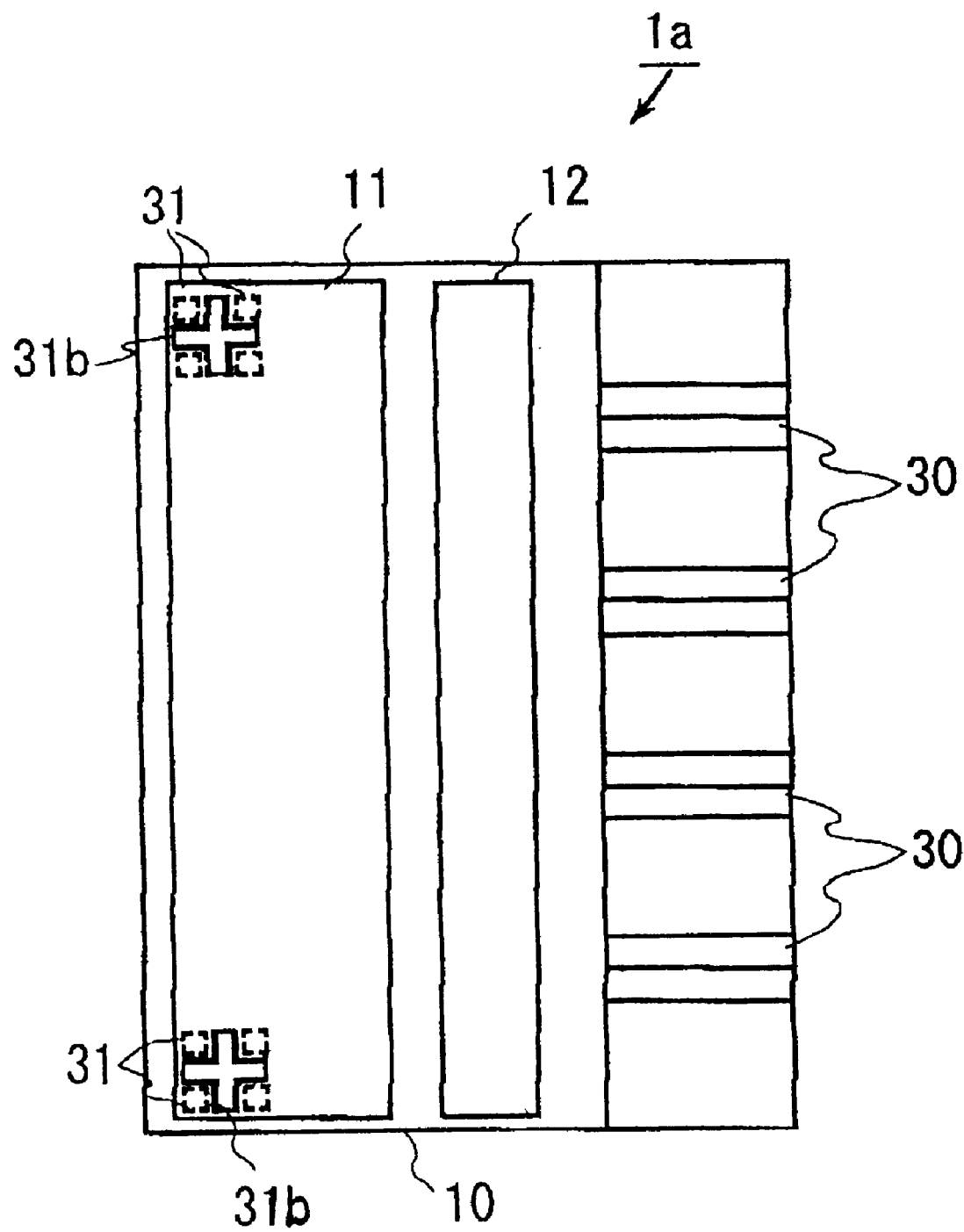
FIG. 6 is a top view of the optical coupling module according to the variation of the first embodiment of the present invention.
Figure 7:
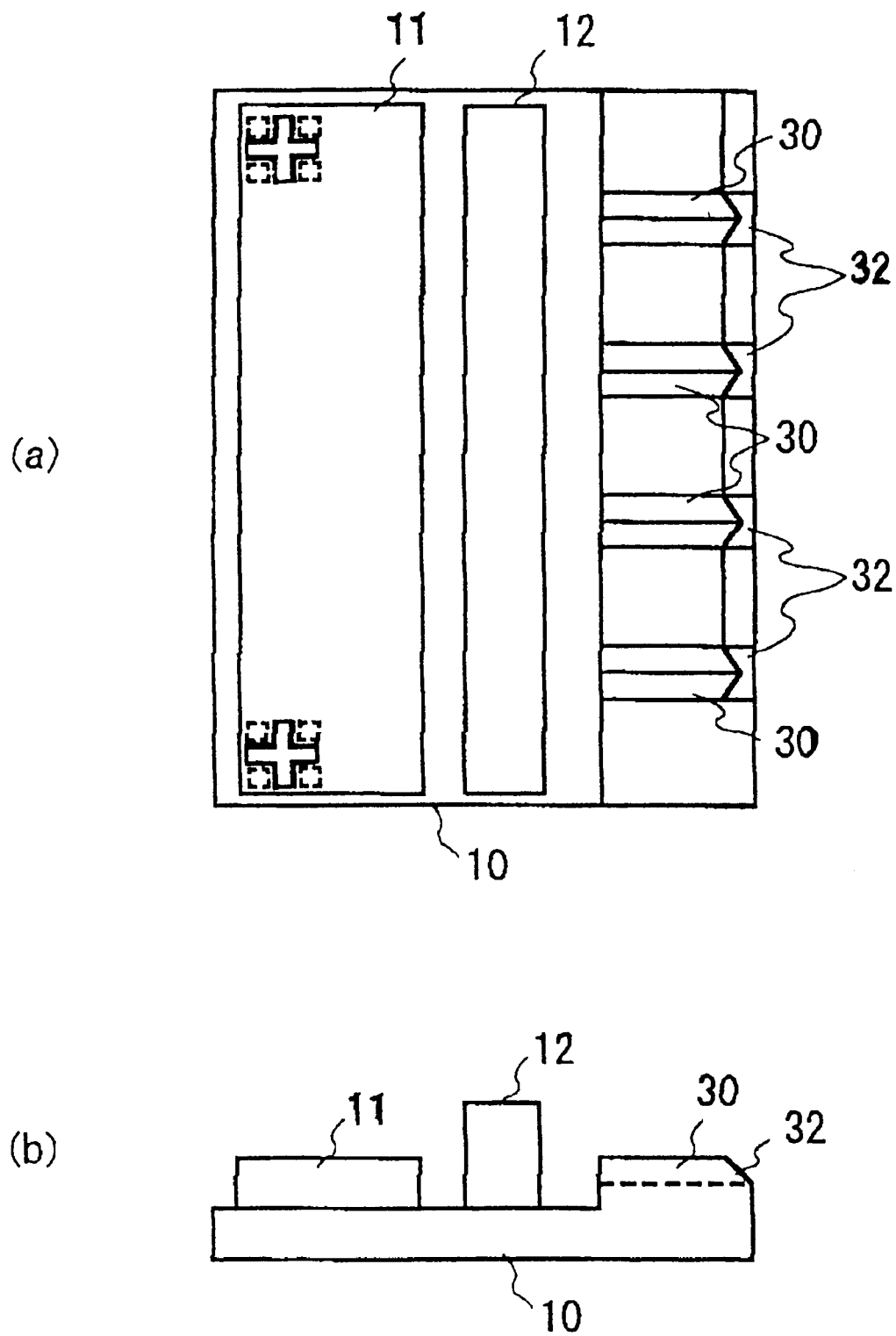
FIG. 7(*a*) is a top view of the optical coupling module according to the variation of the first embodiment of the present invention.

FIG. 5 is an oblique view of an optical coupling module 1a according to a variation of the first embodiment of the present invention. FIG. 6 is a top view of the optical coupling module 1a. In this optical coupling module 1a according to a variation of the first embodiment, multiple grooves 30 are formed at positions on the opposite side of the semiconductor laser 11 across the fiber plate 12 on the surface of the substrate 10. Each of the grooves 30 is formed corresponding to the multiple light beams emitted from the semiconductor laser 11. The trough line that appears at the deepest portion of each of the grooves 30 is parallel to the optical axis X of corresponding one of the lights emitted from the semiconductor laser 11. The V-shaped grooves 30 are formed by performing an anisotropic etching process on silicon.

When the fiber ribbon 16 is installed on the surface of the substrate 10, each of the optical fibers 15 is inserted into a corresponding one of the grooves 30. The optical axis Z (core center portion) of each of the optical fibers 15 then matches the optical axis X of corresponding one of the lights emitted from the semiconductor laser 11.

Except that these multiple grooves 30 are formed, the optical coupling module 1a according to this variation of the first embodiment has the same structure as the optical coupling module 1 according to the first embodiment that has been explained with reference to FIG. 1. Therefore, in the optical coupling module 1a shown in FIGS. 5 and 6, the same reference numerals are given to the same components used in the optical coupling module 1 explained with reference to FIG. 1. Such components will not be explained here.

According to the optical coupling module 1a according to this variation of the first embodiment, the optical axis Z of each of the optical fibers 15 can be matched with the optical axis X of a corresponding one of the light beams emitted from the semiconductor laser 11 by inserting the optical fibers 15 into the corresponding grooves 30. Therefore, the core of each of the optical fibers 15 can be easily adjusted. Thus, multi-channel receptacle connection becomes possible. In the optical coupling module 1a according to this variation of the first embodiment, each of the grooves 30 is formed in such a manner that, for example, when a multi-mode fiber of diameter 125 m is inserted into one of the grooves 30, the height of the core center portion of the multi-mode fiber will become equal to the height of the light emission unit of the semiconductor laser 11.

Furthermore as shown in FIGS. 5 and 6, alignment marks 31 for aligning the semiconductor laser 11 may be formed on the surface of the substrate 10. Such alignment marks 31 can be formed simultaneously when wire-bonding for the semiconductor laser 11 or a wire pattern of die-bonding is formed. The alignment mark 31b on the semiconductor laser 11 side is aligned with corresponding one of the alignment marks 31. The semiconductor laser 11 is then bonded to the surface of the substrate 10. As a result, the optical axis X of each of the light beams emitted from the semiconductor laser 11 can be matched with the direction of a corresponding one of the grooves 30. When the semiconductor laser 11 is bonded to the surface of the substrate 10, the alignment marks 31 are identified using an infrared ray that transmits through the semiconductor laser 11 and the substrate 10.

Furthermore, in order to make it easy to insert each of the optical fibers 15 into a corresponding one of the grooves 30, a tapered surface 32 for guiding the inserted optical fiber 15 may be formed on the end portion of the groove 30. In this way, each of the optical fibers 15 is guided into the groove 30 and can be easily inserted into the groove 30 when the fiber ribbon 16 is coupled.

Figure 8:
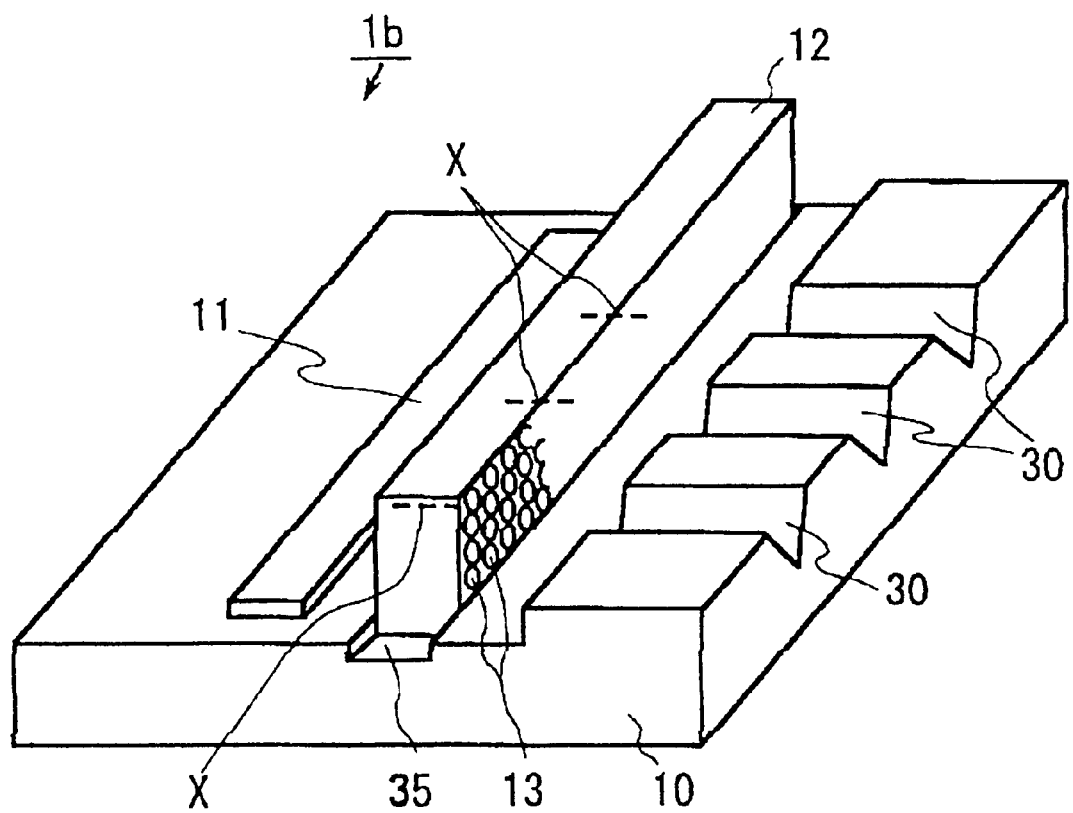
FIG. 8 is an oblique view of an optical coupling module according to another variation of the first embodiment of the present invention.
Figure 9:
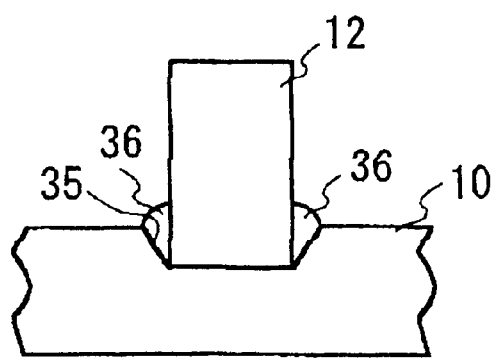
FIG. 9 is a magnified view of the key components of the optical coupling module according to another variation of the first embodiment of the present invention.
Figure 10:
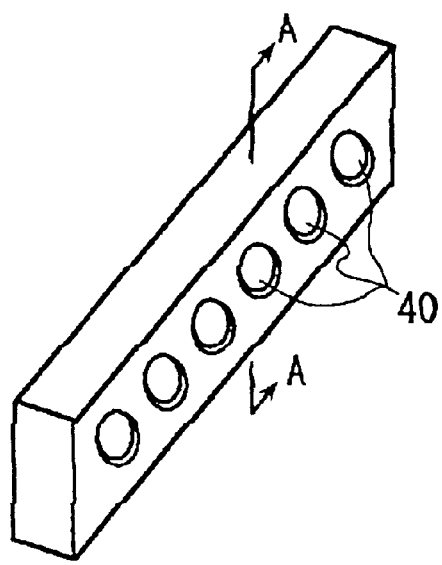
FIG. 10 is an oblique view of a fiber plate on a side of which guide holes are formed.

FIG. 8 is an oblique view of an optical coupling module 1b according to another variation of the first embodiment of the present invention. FIG. 9 is a magnified view of the key components of the optical coupling module 1b according to another variation of the first embodiment of the present invention. In this optical coupling module 1b, a concave portion 35 for fixing the fiber plate 12 is formed on the surface of the substrate 10. When the fiber plate 12 is fixed on the surface of the substrate 10, the bottom portion of the fiber plate 12 is inserted into this concave portion 35. Thus, the optical fibers 13 that constitute the fiber plate 12 are positioned so that they become parallel to the optical axes X of the semiconductor laser 11. The width of the concave portion 35 should be approximately equal to the width of the fiber plate 12. Moreover, in order to make the insertion of the fiber plate 12 easy, the side surface of the concave portion 35 may be tapered so that the width of the concave portion 35 will decrease monotonically from the end from which the fiber plate 12 is inserted into the concave portion 35. In order to fix the fiber plate 12 on the substrate 10, the bottom portion of the fiber plate 12 is first inserted into the concave portion 35. The fiber plate 12 is then temporarily fixed on the substrate 10 applying a pressure to some extent so that the fiber plate 12 will not move. In this state, as shown in FIG. 10, the gap remaining between the side wall of the fiber plate 12 and the slope of the concave portion 35 is filled with an adhesive 36 of an ultraviolet hardening type. After this, an ultra violet ray is projected onto the adhesive 36 to harden the adhesive 36.

In this optical coupling module 1b also, V-shaped grooves 30 are formed on the surface of the substrate 10 as in the case of the optical coupling module 1a explained with reference to FIGS. 5 and 6. The optical fibers 15 are positioned using these V-shaped grooves 30. Except that these multiple grooves 30 and concave portion 35 are formed, the optical coupling module 1b has the same structure as the optical coupling module 1 according to the first embodiment that has been explained with reference to FIG. 1. Therefore, in the optical coupling module 1b shown in FIG. 8, the same reference numerals are given to the same components used in the optical coupling module 1 explained with reference to FIG. 1. Such components will not be explained here.

In the optical coupling module 1b according to this variation, the bottom portion of the fiber plate 12 is inserted into the concave portion 35 formed on the surface of the substrate 10 to fix the fiber plate 12 on the substrate 10. As a result, the optical fibers 13 constituting the fiber plate 12 can be positioned parallel with the optical axes X of the semiconductor laser 11. To accomplish this, the surface of the substrate 10 is marked using a marker to position the semiconductor laser 11. In this way, the relative positions of the fiber plate 12 and semiconductor laser 11 can be easily aligned (the optical fiber 13 of the fiber plate 12 is aligned with the optical axes X of the semiconductor laser 11.)

Figure 11:
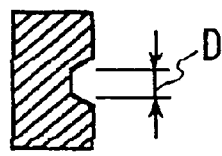
FIG. 11 is a cross sectional arrow view of what is shown in FIG. 10 across A—A.

As shown in FIG. 10, guide holes 40 into which the tips of the optical fibers 15 are inserted maybe formed on a side surface of the fiber plate 12. FIG. 11 is a cross sectional arrow view across A—A of what is shown in FIG. 10. The diameter D of each of the guide holes 40 is made approximately equal to the diameter of each of the optical fibers 15. In particular, in order to make the insertion of the optical fiber 15 easy, the internal diameter of the guide hole 40 is decreased monotonically as one proceeds deeper inward so that the guide hole 40 will have a tapered shape. The depth of the guide hole 40 is set to, for example, about 50 μm. The tip of the optical fiber 15 is then inserted into this guide hole 40. As a result, the optical axis Z of each of the optical fibers 15 matches a corresponding one of the optical axes X of the semiconductor laser 11.

Figure 12:
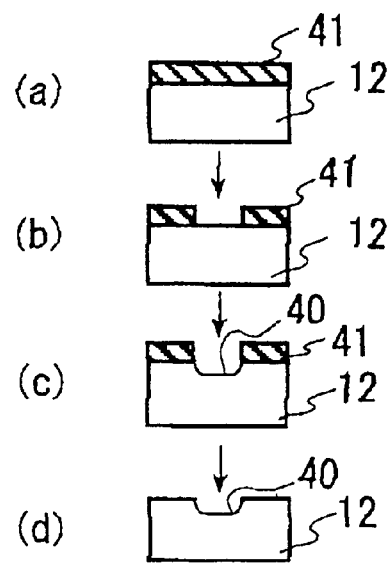
FIG. 12 explains the construction procedure of the guide holes.

In order to form such a guide hole 40, as shown in FIG. 12(a), the side surface of the fiber plate 12 is coated with a photosensitive resist 41. Next, as shown in FIG. 12(b), the portion on which the guide hole 40 is to be formed is exposed. Next, as shown in FIG. 12(c), etching is performed to form a guide hole 40 using, for example, an etchant containing hydrofluoric acid. Finally, as shown in FIG. 12(d), the resist film 41 is removed from the side surface of the fiber plate 12.

In performing the etching, side etching is done. Therefore, the guide hole 40 becomes a tapered shape so that the inside diameter of the guide hole 40 decreases monotonically as one proceeds inward. Hence, the tip of each of the optical fibers 15 can be easily inserted into a corresponding one of the guide holes 40. Moreover, the tip of each of the optical fibers 15 is guided by the side surface of the guide hole 40. Thus, the optical axis Z of the optical fiber 15 easily matches a corresponding one of the optical axes X of the semiconductor laser 11.

Figure 13:
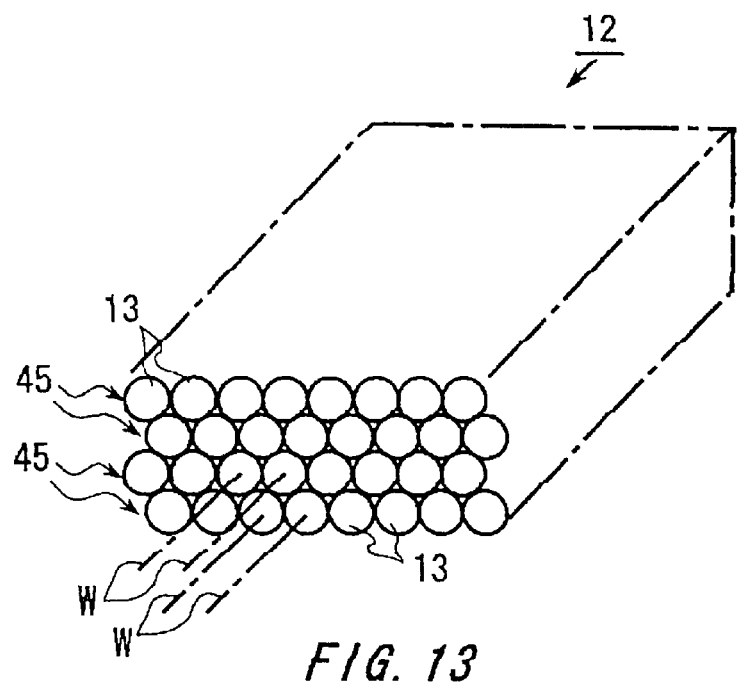
FIG. 13 is an oblique view of a fiber plate constructed by stacking fiber layers in multiple stages.

As shown in FIG. 13, the fiber plate 12 is constructed by stacking multiple fiber layers 45 in multiple stages. In each of the fiber layers 45, multiple optical fibers 13 having approximately the same diameter are arranged parallel and adjacent with each other.

In this case, it is desirable that the optical axes of the optical fibers 13 that constitute a given fiber layer 45 be displaced from the optical axes of the optical fibers 13 that constitute the fiber layer immediately above or below the given fiber layer 45 (in a staggered arrangement). As a result of this arrangement, the multiple optical fibers 13 can be arranged and densely packed uniformly. Thus, the number of optical fibers 13 per unit area becomes uniform everywhere. Hence, the light can be propagated uniformly regardless of the position of the optical fiber 13. As a result, the optical coupling efficiency of the fiber plate 12 becomes uniform for every optical fiber 15.

Figure 14:
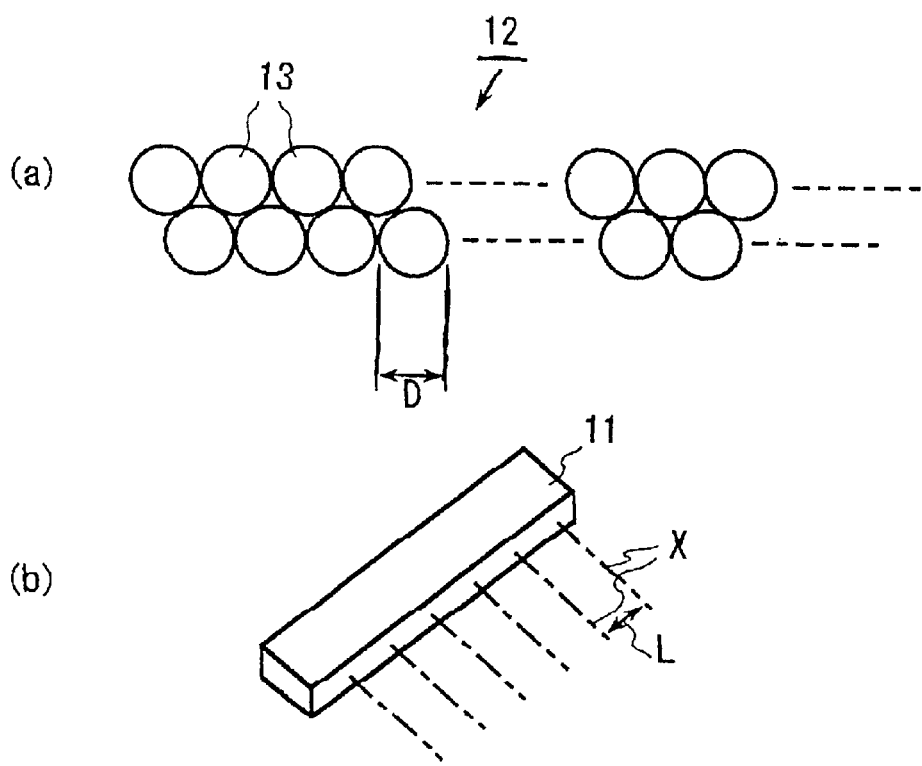
FIG. 14(a) is a magnified view of the fiber plate constructed by stacking fiber layers in multiple stages.
FIG. 14(b) explains the pitch of the optical axis of the semiconductor laser.

In this case, as shown in FIG. 14 (a), it is desirable that the pitch L (device pitch) of the optical axes X of the semiconductor laser 11 shown in FIG. 14 (b) be an integral multiple of the diameter D of the optical fiber 13 as described by the following equation.

L=n×D (n: an arbitrary integer)

In this way, the pitch L of the optical axes X of the semiconductor laser 11 becomes an integral multiple of the diameter D of the optical fiber 13 (equal to the arrangement pitch of the optical fibers 13) that constitutes the fiber plate 12. Therefore, each of the light beams emitted from the multiple spots on the side surface of the semiconductor laser 11 is injected into the corresponding one of the same number of optical fibers 13. Thus, the spot size of each of the light beams that have passed through the fiber plate 12 becomes uniform. As a result, the optical coupling efficiency with respect to the fiber ribbon 16 becomes uniform. Therefore, the skews that are time differences generated between the transmission speeds of the light beams that propagates through the channels become small.

Figure 15:
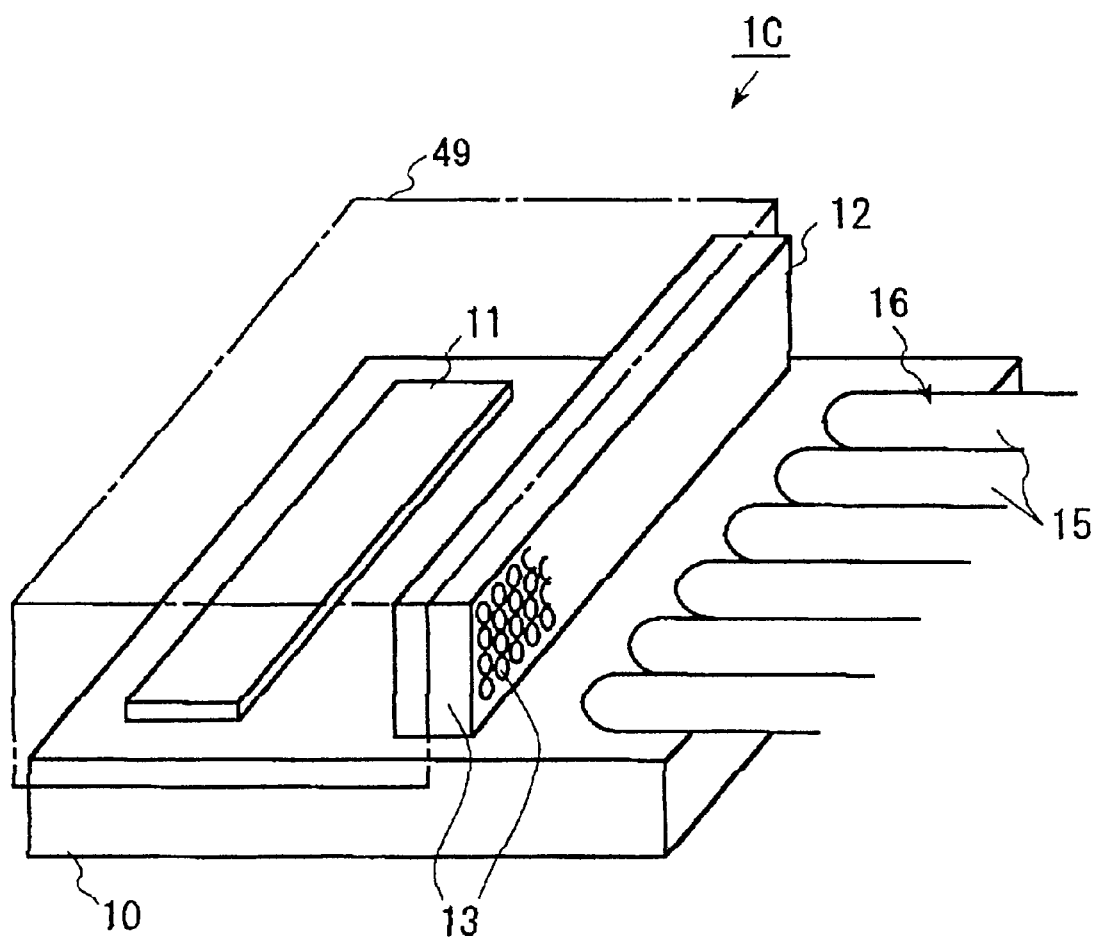
FIG. 15 is an oblique view of an optical coupling module according to a further variation of the first embodiment of the present invention.

FIG. 15 is an oblique view of an optical coupling module 1c according to a further variation of the first embodiment of the present invention. In this optical coupling module 1c, the semiconductor laser 11 fixed on the substrate 10 is tightly sealed inside a container 49. The fiber plate 12 constitutes one side surface of this container 49. Thus, the lights emitted from the semiconductor laser 11 passes through the optical fibers 13 that constitute the fiber plate 12 and propagates into the optical fibers 15 positioned outside the container 49.

Except that the semiconductor laser 11 is tightly sealed inside the container 49, this optical coupling module 1c has the same structure as the optical coupling module 1 according to the first embodiment that has been explained with reference to FIG. 1. Therefore, in the optical coupling module 1c shown in FIG. 16, the same reference numerals are given to the same components used in the optical coupling module 1 explained with reference to FIG. 1. Such components will not be explained here.

According to the optical coupling module 1c shown in FIG. 15, the semiconductor laser 11 as an optical device remains sealed airtight inside the container 49. Therefore, the fiber ribbon 16, which is a receptacle type optical circuit, can be easily connected outside the container 49.

In the optical coupling module 1 according to the first embodiment, and the three variations of the optical coupling module 1, the semiconductor laser 11 as an exemplary optical device is installed on the surface of the substrate 10. However, instead of a light emitting device like the semiconductor laser 11, a light receiving device such as a photo diode or another optical device such as an electric field absorption type optical modulation module or the like may be used. For example, when a light receiving device is installed on the surface of the substrate 10, the lights emitted from the fiber ribbon 16 propagate through the optical fibers 13 that constitute the fiber plate 12 and are coupled to the light receiving device. Thus, the coupling efficiency is improved.

Figure 16:
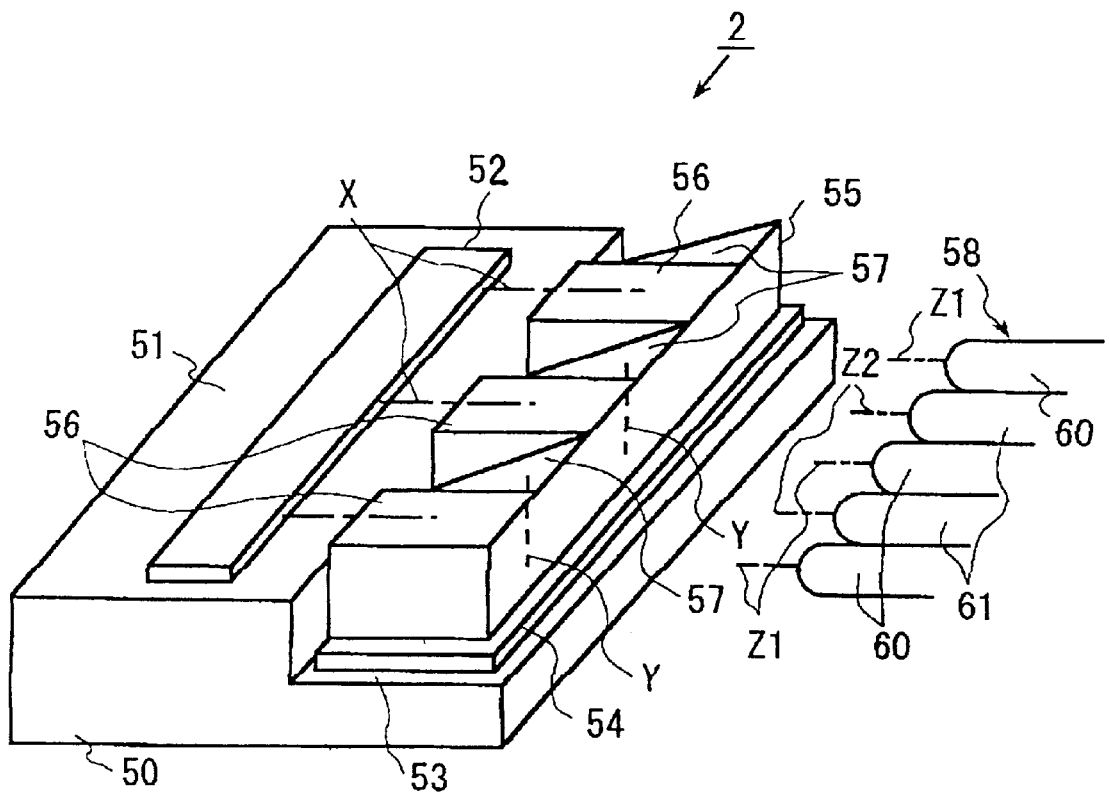
FIG. 16 is an oblique view of an optical coupling module according to a second embodiment of the present invention.

FIG. 16 is an oblique view of an optical coupling module 2 according to the second embodiment of the present invention. As in the case of the first embodiment, the substrate 50 is formed using silicon, ceramic, glass or the like. A step is formed on the top surface of the substrate 50. An end face output type semiconductor laser 52 as an optical device (light emitting device) is fixed and bonded on the upper stage 51 of the step of the substrate 50. On the other hand, a surface light receiving type light receiving device 54 as another optical device is fixed and bonded on the lower stage 53 of the step. The light receiving device 54 is constituted of, for example, a photo diode. The optical axes X of the light beams emitted in parallel with an equal separation distance from multiple spots on the side surface of the semiconductor laser 52 are perpendicular to the optical axes Y of the light beams that propagate with an equal separation distance parallel into the light receiving unit installed at multiple spots on the surface of the light receiving device 54. In the example shown in the drawing, the pitch of these optical axes X and Y is set to 250 μm.

Figure 17:
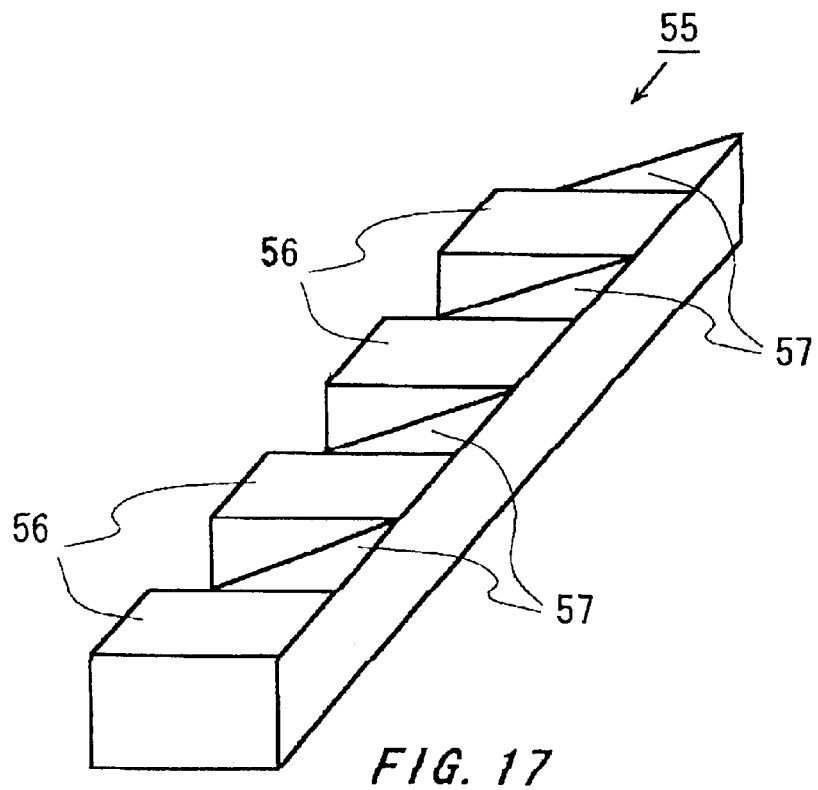
FIG. 17 is an oblique view of the lens array.

A lens array 55 is installed above the light receiving device 54. The lens array 55 propagates the light emitted from the semiconductor laser 52 and the light that enters into the light receiving device 54. As shown in FIGS. 16 and 17, transmission units 56 and reflection units 57 are alternately installed to form the lens array 55. The transmission units 56 transmit the light emitted from the semiconductor laser 52 without deflecting it. The reflection units 57 deflect the light that enters into the light receiving device 54.

In the example shown in the drawing, the pitch of these transmission units 56 and reflection units 57 is set equal to the pitch 250 μm of the optical axes X and Y. The relative positions of the semiconductor laser 52, light receiving device 54, and lens array 55 are determined when diebonding is performed.

In the example shown in FIG. 16, a fiber ribbon 58 is installed on the opposite side of the semiconductor laser 52 across the lens array 55. The fiber ribbon 58 is constituted of multiple optical fibers 60 and 61 arranged alternately in parallel. This fiber ribbon 58 propagates both the light emitted from the semiconductor laser 52 and the light that enters into the light receiving device 54.

Figure 18:
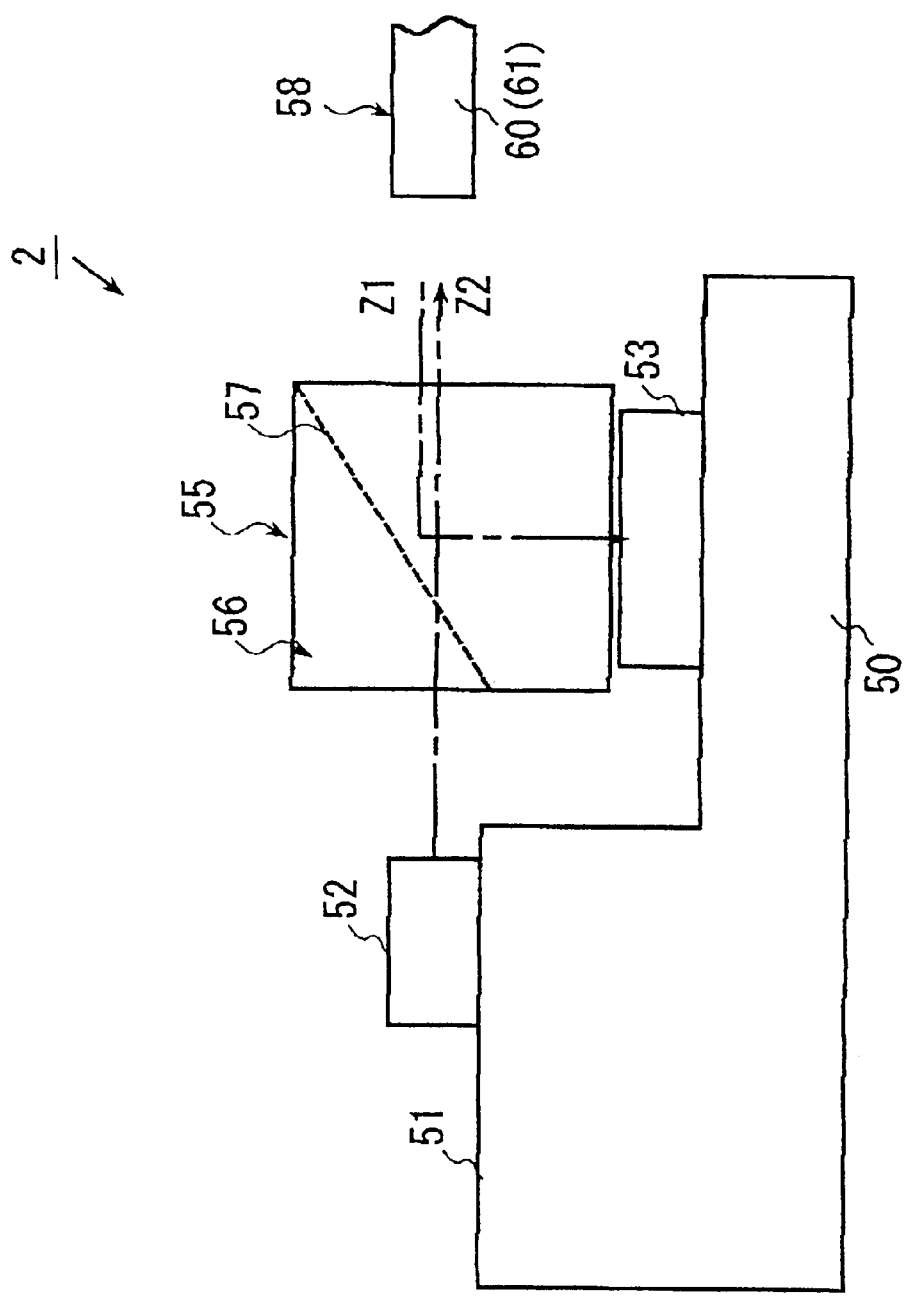
FIG. 18 explains the state of propagation of the light in the optical coupling module according to the second embodiment of the present invention.

The optical axes Z1 of the optical fibers 60 match the optical axes X of the light beams emitted from the semiconductor laser 52 in a one-to-one correspondence. The optical axes Z2 of the optical fibers 61 are deflected by the reflection units 57 and are coupled to the light receiving units of the light receiving device 54. Thus, as shown in FIG. 18, the light emitted from the semiconductor laser 52 passes through the transmission units 56 of the lens array 55 without being deflected, and is coupled to the optical fibers 60. The light that has propagated through the optical fibers 61 is deflected by the reflection units 57 of the lens array 55, and enters into the light receiving units of the light receiving device 54. In this way, the light emitted from the semiconductor laser 52 is transmitted through the transmission units 56 of the lens array 55, and the light that has propagated through the optical fibers 61 are deflected by the reflection units 57 of the lens array 55.

In this optical coupling module 2 of the second embodiment, a semiconductor laser 52 and a light receiving device 54 are installed on a single substrate 50, and a lens array 55 is further installed on the light receiving device 54. Thus, a multi-channel light emitting receiving light transmission device can be constructed. Hence, a single optical coupling module 2 can transmit emitted light and received light. Moreover, the module can be downsized.

Figure 19:
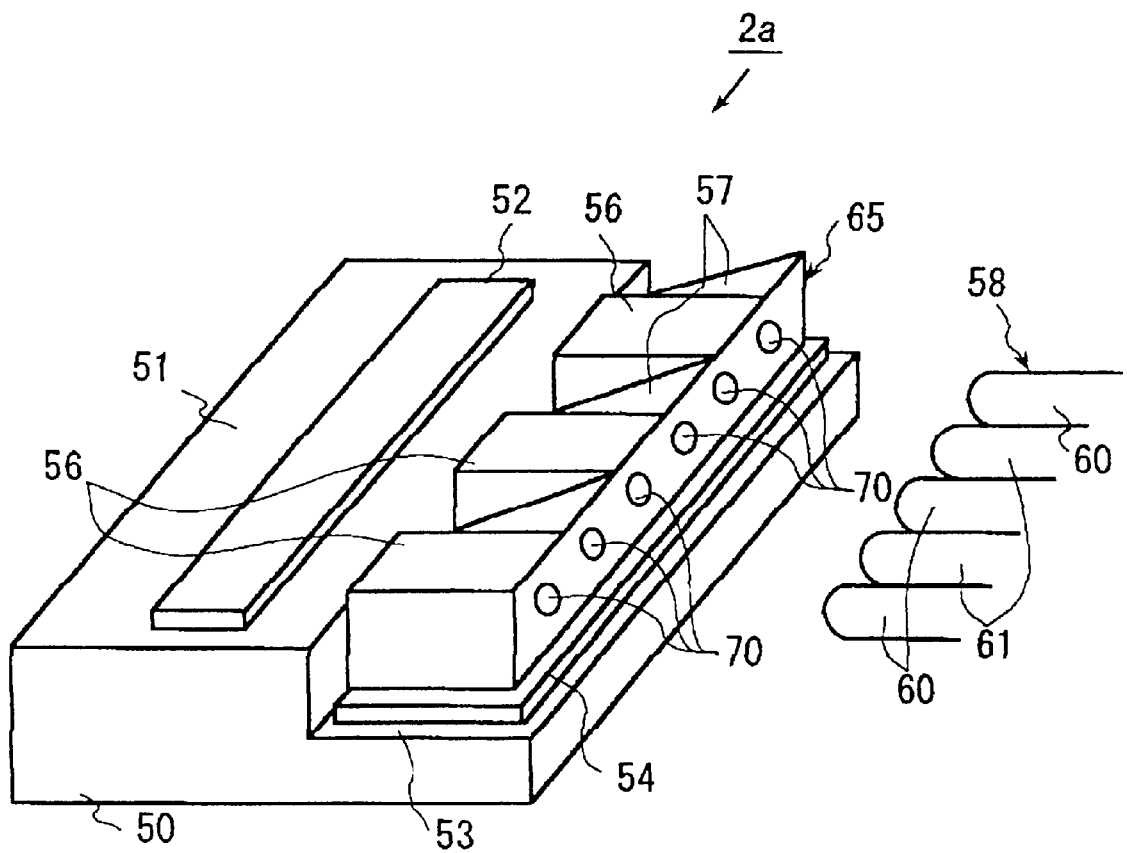
FIG. 19 is an oblique view of an optical coupling module according to a variation of the second embodiment of the present invention.
Figure 20:
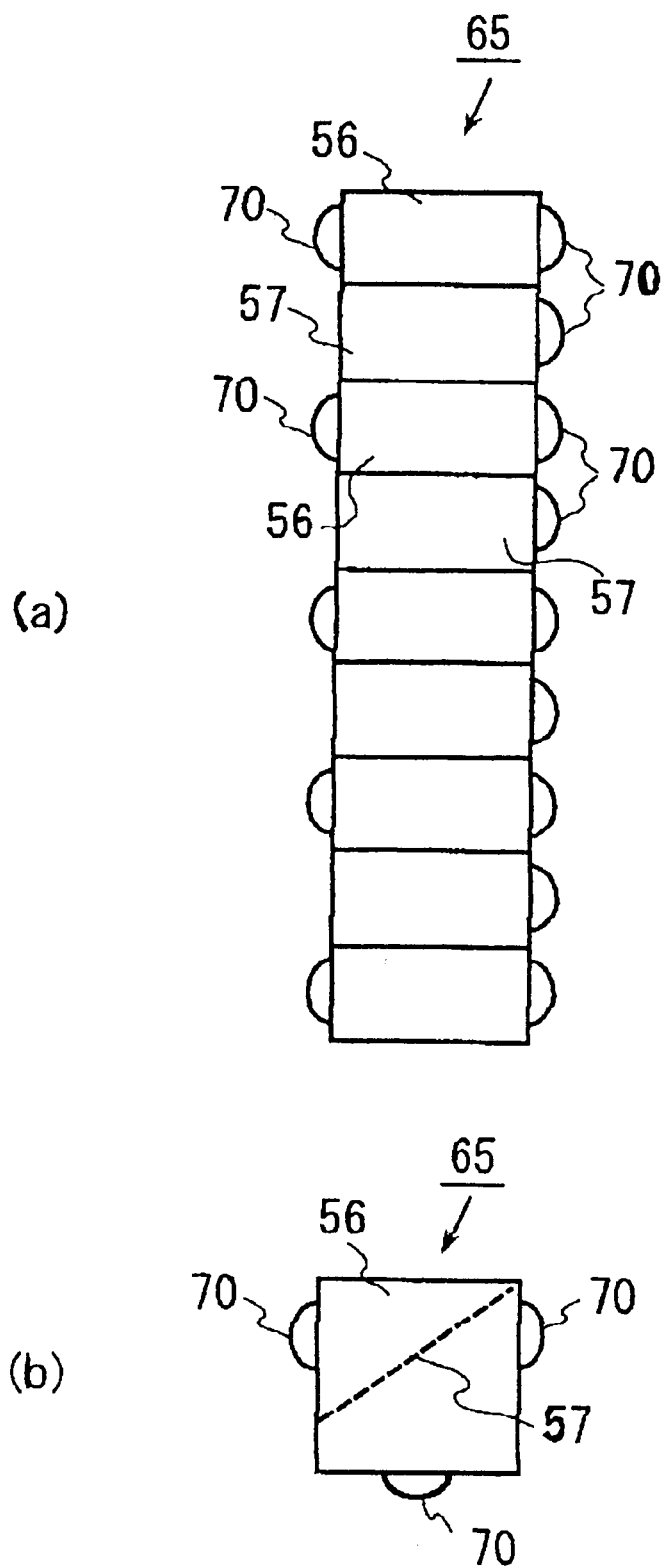
FIG. 20(a) is a top view of the lens array of the optical coupling module according to the variation of the second embodiment of the present invention.
FIG. 20(b) is a side view of the optical coupling module according to the variation of the second embodiment of the present invention.

FIG. 19 is an oblique view of an optical coupling module 2*a* according to a variation of the second embodiment of the present invention. FIG. 20(*a*) is a top view of the lens array 65 of this optical coupling module 2*a*. FIG. 20(*b*) is a side view of the lens array 65 of this optical coupling module 2*a*. Micro lenses 70 are installed on the surface of this lens array 65. These micro lenses 70 condense the light that is emitted from the semiconductor laser 52, passes through the transmission unit 56, and propagates into the optical fibers 60. At the same time, these micro lenses 70 condense the light that propagates through the optical fibers 61, is deflected by the reflection unit 57, and enters into the light receiving unit of the light receiving device 54.

As shown in FIGS. 20(*a*) and 20(*b*), in each of the transmission units 56, micro lenses 70 are installed on the front and back surfaces of the lens array 65, respectively. On the other hand, in each of the reflection units 57, micro lenses 70 are installed on the front and bottom surfaces of the lens array 65, respectively. The installation pitch of these micro lenses 70 is set equal to the pitch 250 μm of the optical axes X of the light beams emitted from the semiconductor laser 52 and the optical axes Y of the light beams that enter into the light receiving unit of the light receiving device 54.

Except that the micro lenses 70 are installed on the surface of the lens array 65, this optical coupling module 2*a* has the same structure as the optical coupling module 2according to the second embodiment that has been explained with reference to FIG. 17. Therefore, in the optical coupling module 2*a* shown in FIG. 19, the same reference numerals are given to the same components used in the optical coupling module 2 explained with reference to FIG. 16. Such components will not be explained here.

According to this optical coupling module 2*a* of this variation of the second embodiment, the light emitted from the semiconductor laser 52 is condensed by the micro lenses 70 when this light enters into the transmission units 56 of the lens array 65 and when the light exits from the transmission units 56. The condensed light is then coupled to the optical fibers 60 of the fiber ribbon 58. On the other hand, the light that has propagated through the optical fibers 61 is condensed by the micro lenses 70 when this light enters into the reflection units 57 of the lens array 65 and when the light exits from the reflection units 57. The condensed light then enters into the light receiving device 54. Therefore, according to this optical coupling module 2*a* of this variation of the second embodiment, the same effects as the optical coupling module 2 shown in FIG. 2 can be achieved. In addition, the coupling efficiency is further improved since the micro lenses 70 condense the light.

Figure 21:
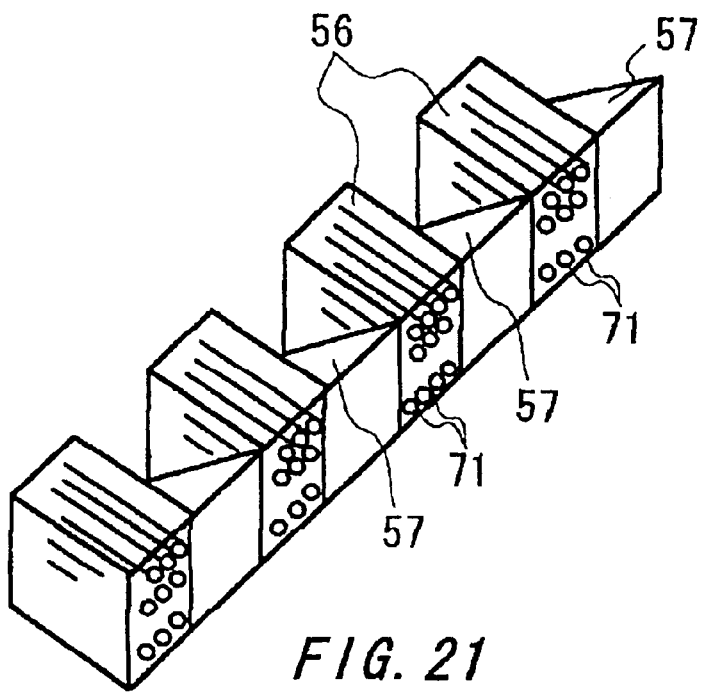
FIG. 21 is an oblique view of a lens array whose transmission unit has been constructed by bundling optical fibers.

In the same manner as the fiber plate 12 of the optical coupling module 1 of the first embodiment, each of the transmission units 56 of the lens array 66 shown in FIG. 21 is constructed by bundling multiple optical fibers 71 that are arranged parallel with the optical axes X the semiconductor laser 52. The reflection units 57 of the lens array 66 deflect the light that enters into the light receiving device 54 in the same manner as the lens array 65 of the optical coupling module 2 of the second embodiment explained with reference to FIG. 17.

The lens array 66 shown in FIG. 21 receives the light emitted from the semiconductor laser 52, transmits the received lights through the optical fibers 71, and then couples the light with the optical fibers 60. Thus, the spot size of each of the optical fibers 60 is matched with the spot size of the light beam that enters into a corresponding one of the optical fibers 71. Hence, the coupling efficiency is improved.

Figure 22:
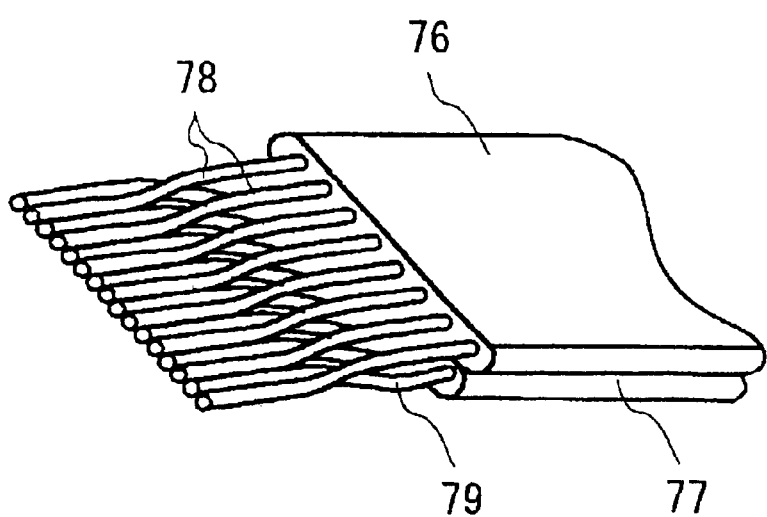
FIG. 22 is an oblique view of a structure in which a ribbon fiber is stacked on another ribbon fiber.

A surface light receiving type light receiving device is generally used for the light receiving device 54. Hence, the diameter of the light receiving area of the light receiving device 54 is about 30 μm. On the other hand, the light emitting unit of the semiconductor laser 52 generates a light beam whose diameter is about 5 μm. In other words, the optical axis alignment tolerance level of the semiconductor laser 52 is lower than that of the light receiving device 54. However, when the lens array 66 shown in FIG. 22 is used, each of the transmission units 56 is constituted of optical fibers 71. Therefore, it suffices to install the optical fibers 71 parallel to the optical axes X of the semiconductor laser 52 so that there is no need to adjust the cores of the optical fibers 71 precisely.

Figure 23:
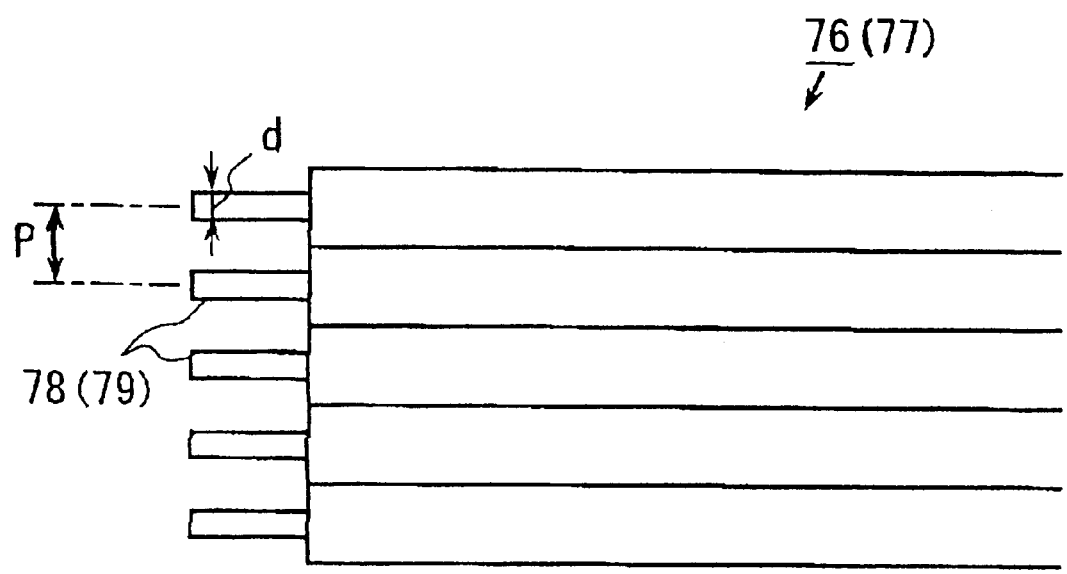
FIG. 23 is a top view of the ribbon fiber.

The ribbon fiber 75 shown in FIG. 22 is constructed superposing a ribbon fiber 76 on another ribbon fiber 77. Moreover, the tips of the optical fibers 78 and 79 that constitute the ribbon fibers 76 and 77, respectively, are arranged alternately in parallel. As shown in FIG. 23, the center pitch PI of the optical fibers 78 (core portions) of the ribbon fiber 76 is equal to the center pitch of the optical fibers 79 (core portions) of the ribbon fiber 77, which is set to 250 μm. The diameter d of each of the optical fibers 78 and 79 (wire portions) is 125 μm. This diameter d of each of the optical fibers 78 and 79 (wire portions) is the same regardless of whether the optical fibers 78 and 79 are single mode fibers or multi-mode fibers. In this way, the ribbon fiber 76 is superposed on the ribbon fiber 77, and the tips of the optical fibers 78 and 79, respectively, are arranged alternately in parallel. Thus, the fiber array shown in FIG. 22 is manufactured. Since the tips of the optical fibers 78 and 79, respectively, are arranged alternately in parallel, the pitch $P_2$ of the centers of the core portions of the optical fibers 78 and 79 of this fiber array is 125 μm.

Figure 24:
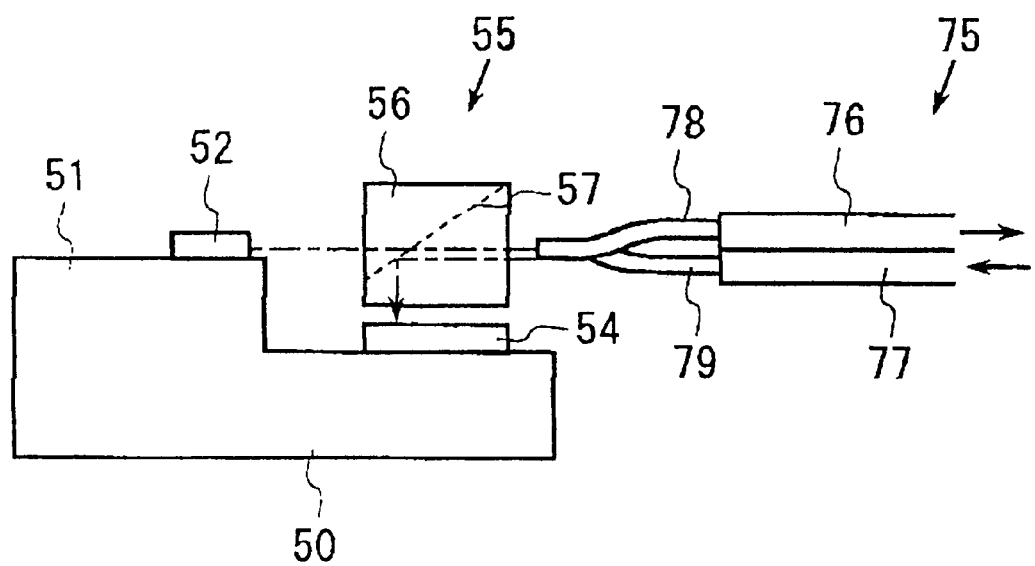
FIG. 24 explains the state in which the emitted light generated by the semiconductor laser and the incident light that enters the light receiving device are propagated through separate ribbon fibers, respectively.

The ribbon fiber 75 shown in FIG. 22 is used, for example, in the optical coupling module 2 shown in FIG. 16 in place of the ribbon fiber 58. As a result, as shown in FIG. 24, the semiconductor laser 52 is optically coupled to the optical fibers 78 via the transmission units 56 of the lens array 55, and the optical fibers 79 are optically coupled to the light receiving device 54 via the reflection units 57 of the lens array 55.

The optical coupling module 2 as a single module constructed in the above-described manner can transmit and receive optical signals. Therefore, the module can be downsized. Moreover, when an optical signal transmission system is constructed using this optical coupling module 2, the signal processing mechanism of the optical signal transmission system can be simplified. In actual optical signal transmission systems, the circuit for processing the light emitted from the module is generally different from the circuit for processing the light that enters into the module. Therefore, outside the module, the emitted light is required to be easily separable from the incident light. This requirement in the actual systems can be fulfilled by using the fiber ribbon 75 shown in FIG. 23.

In the embodiments described above, the light emitted from the semiconductor laser 52 is transmitted through the transmission units 56, and the light deflected by the reflection units 57 of the lens array 55 is injected into the light receiving units of the light receiving device 54. However, the role of the transmission units 56 may be switched with that of the reflection units 57. In this case also, a multi-channel light emitting receiving light transmission device can be constructed, and the module can be downsized.

In addition, in the optical coupling module 2 of the second embodiment and the other variations also, each optical fiber may be positioned by forming grooves on the substrate in the same manner as described with reference: to FIGS. 5 and 6. Moreover in the same manner as explained with reference to FIG. 8, a concave portion for fixing the lens array 55 may be formed. Guide holes 40 for guiding inserted tips of the optical fibers 60 and 61 of the fiber ribbon 58 may be formed on the side surface of the lens array 55. Furthermore, in the same manner as explained with reference to FIG. 15, the semiconductor laser and light receiving device fixed on the substrate may be sealed inside a container.

Figure 25:
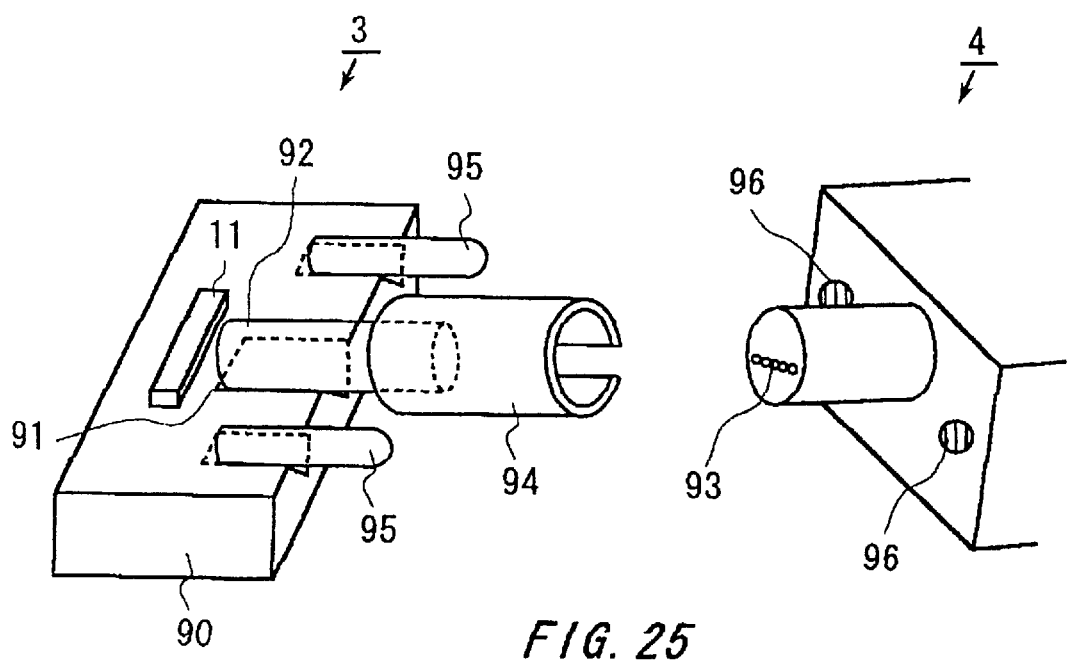
FIG. 25 is an oblique view of an optical coupling module according to a third embodiment of the present invention.

In what follows, the third embodiment of the present invention will be explained. FIG. 25 is an oblique view of an optical coupling module 3 according to the third embodiment of the present invention. As in the first embodiment, the substrate 90 is made of silicon, ceramic, glass, or the like. On the surface of the substrate 90, the end output type semiconductor laser 11 as an optical device (light emitting device) is fixed with solder or the like. The semiconductor laser 11 has multiple light emitting units arranged with an equal distance of separation. The V-shaped groove 91 is formed on the surface of the substrate 90. This V-shaped groove 91 is formed by performing an anisotropic etching process on silicon. The trough line that appears at the deepest part of the V-shaped groove 91 is parallel to the optical axis of the light emitted from the side surface of the semiconductor laser 11. The image fiber 92 is inserted into this V-shaped groove 91.

The image fiber 92 is constructed by bundling multiple optical fibers and drawing these bundled optical fibers. For example, in the manufacturing process of the fiber plate shown in FIG. 3, FIG. 3(e) describes this state in which multiple optical fibers are stored inside a quartz jacket and drawn. The light emitted from the semiconductor laser 11 enters into the image fiber 92 and propagates through the corresponding optical fibers that constitute the image fiber 92. Thus, the light that has entered into the image fiber 92 propagates through and exit from the image fiber 92 as in the case of a standard optical fiber transmission. That is, in this third embodiment also, the light emitted from the semiconductor laser 11 propagates through and exits from the image fiber 92 without diverging inside the image fiber 92. Therefore, the distribution of the light when the light entered the image fiber 92 is reproduced on the exit surface of the image fiber 92.

Here, the depth of the V-shaped groove 91 needs to be determined so that the center of the image fiber 92 will have the same height as the light emission units of the semiconductor laser 11. Since the diameter of a standard image fiber is about 2 mm, the depth of the V-shaped groove 91 will be set to about 1 mm. After the image fiber 92 has been inserted into the V-shaped groove 91, the image fiber 92 is temporarily fixed upright so that it will not move, and then is fixed with an ultraviolet hardening type resin.

The optical coupling module 3 of the third embodiment is connected to the optical connector 4. In what follows, the configuration of the optical connector 4 will be explained. The optical connector 4 has a tape fiber 93. The image fiber 92 is connected to this tape fiber 93. The tape fiber 93 is inserted into a guide having the same outside diameter as the image fiber 92. The tip of the tape fiber 93 protrudes by a few mm from the main body of the optical connector 4. The wires that constitute the tape fiber 93 are arranged with an equal separation distance on the line of diameter that passes through the center of the guide. The separation distance of the wires that constitute the tape fiber 93 is set equal to that of the light emitting units of the semiconductor laser 11. Thus, the image fiber 92 and semiconductor laser 11 are core of each of the fibers center of corresponding one installed so that the center of the of the tape fiber 93 will match the of the light beams, which are emitted from the light emitting units of the semiconductor laser 11, that pass through the image fiber 92.

To carry out this installation, an alignment mark for the semiconductor laser 11 is marked on the substrate 90 so that the installation position of the semiconductor laser 11 will coincide with the position of the V-shaped groove 91 of the substrate 90. Using this alignment mark, the semiconductor laser 11 is bonded to the substrate 90. The process of creating the alignment mark and installing the semiconductor laser 11 is the same as the one described with reference to FIGS. 5 and 6. Hence, this process will not be explained in detail here.

The image fiber 92 is connected to the tape fiber 93 using a split sleeve 94. This split sleeve 94 has the same structure as FC connectors and SC connectors that are generally used as optical connectors. The inside diameter of the split sleeve 94 is set equal to the outside diameter of the image fiber 92. That is, if the exterior shape of the image fiber 92 matches that of the guide portion into which the tape fiber 93 is inserted, and if the positions of the core centers of the light emitting units of the semiconductor laser 11 match the positions of the core centers of the corresponding wires of the tape fiber 93, each of these components can be properly positioned. Moreover, in order to position the optical coupling module 3 and optical connector 4 in connecting them together, guide pins 95 are installed on the substrate 90. On the other hand, guide holes 96 are formed on the optical connector 4. Based on this configuration, the light emitted from the semiconductor laser 11 is transmitted using the image fiber 91. The tape fiber 92 then receives and transmits the light.

Therefore, according to the optical coupling module 3 of the third embodiment, the optical coupling module 3 can be coupled with the optical connector 4 without spreading the multiple light emitted from the semiconductor laser 11. Next, by using the image fiber 92, the center of the image fiber 92 is matched with the light emission position of the semiconductor laser 11 using a standard V-shaped groove installation technique. The positioning and connection of the image fiber 92 and tape fiber 93 can be easily performed since the split sleeve 94 is used.

Moreover, since the image fiber 92 is used, the optical axis of each of the wires of the tape fiber 93 coincides with the optical axis of corresponding one of the light emitting units of the semiconductor laser 11 by horizontally aligning the wires of the tape fiber 93 with respect to the substrate 90. Thus, the optical axes of the light of the multiple channels can be aligned. Moreover, by using the guide pins 95 and guide holes 96, the angular displacement between the optical coupling module 3 and the optical connector 4 can be corrected.

Figure 26:
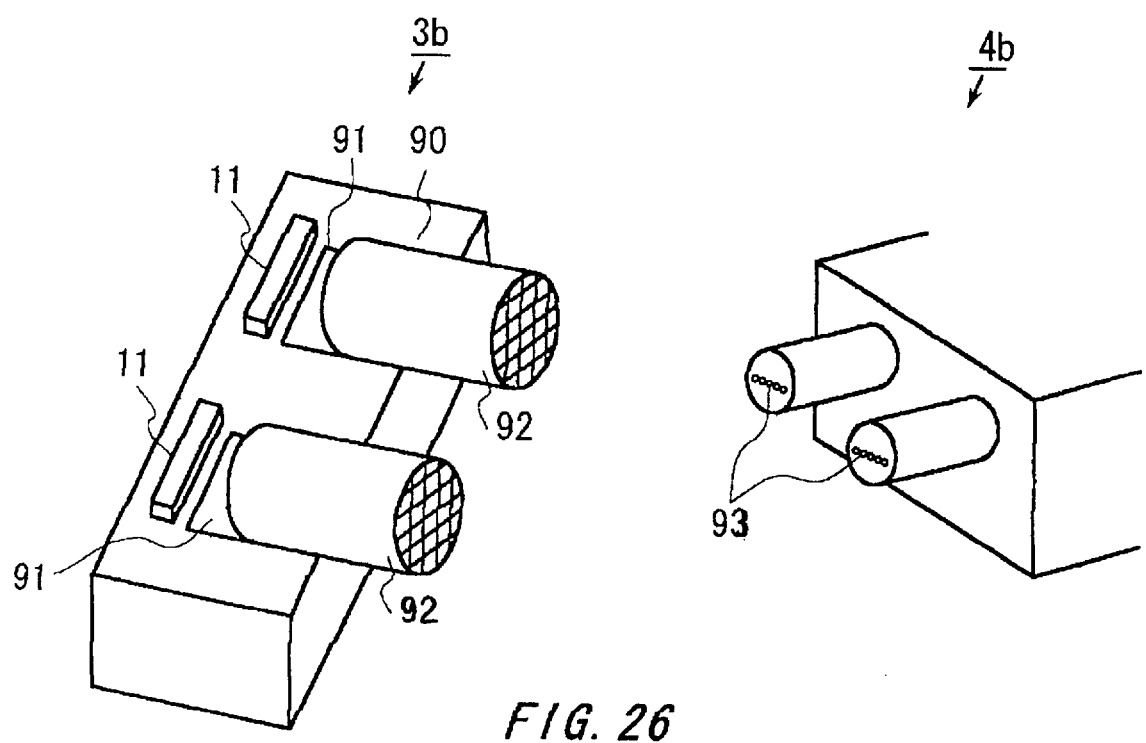
FIG. 26 is an oblique view of an optical coupling module according to a variation of the third embodiment of the present invention.

FIG. 26 is an oblique view of an optical coupling module 3b according to a variation of the third embodiment of the present invention. In this optical coupling module 3b, two parallel V-shaped grooves 91 are formed on the surface of the substrate 90. Two image fibers 92 are installed on the two parallel Vshaped grooves 91, respectively, and are fixed with an ultraviolet hardening type resin. On one side of each of the image fibers 92, a semiconductor laser 11 is installed. These semiconductor lasers 11 are installed in the same manner as in the previously described embodiments. In this variation of the third embodiment, the optical connector 4b also has two tape fibers 93 that are separated by the same distance as the two image fibers 92.

Also in this variation of the third embodiment, each of the tape fibers 93 is positioned and connected with a corresponding one of the image fibers 92 using a split sleeve (not shown in the drawing). However, in this variation of the third embodiment, there is no need to install guide pins and guide holes. Since there are two image fibers 92 and two tape fibers 93, the angular displacement between the optical coupling module 3b and optical connector 4b is corrected when the optical coupling module 3b is connected with the optical connector 4b. Thus, in this variation of the third embodiment also, the optical axes of the multi-channel device can be easily aligned with the cores of the corresponding optical fibers. Two image fibers 92 and two tape fibers 93 are installed in this variation of the third embodiment. However, the number of installed image fibers 92 and tape fibers 9 may be more than two. Moreover, by replacing the semiconductor laser with a light receiving device in this variation of the third embodiment, an optical transceiver module is realized.

Figure 27:
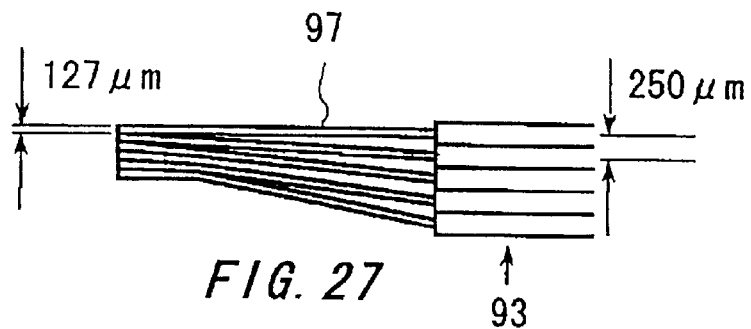
FIG. 27 shows a specific example of wiring of the optical coupling module according to the third embodiment of the present invention.

In what follows, a specific example of the wires used in the optical coupling module according to the third embodiment will be explained with reference to FIG. 27. The semiconductor laser 11 outputs multiple laser light beams separated by an equal distance of 127 $\mu$m. On the other hand, the pitch of the wires that constitute the tape fiber 93 is generally set to 250 $\mu$m. Therefore, the core 97 of each of the wires that constitute the tape fiber 93 is exposed. The cores of all but the top (or bottom) wire are pushed toward the core of the top (or bottom) wire so that the centers of these cores will be separated by an equal distance of 127 $\mu$m.

Figure 28:
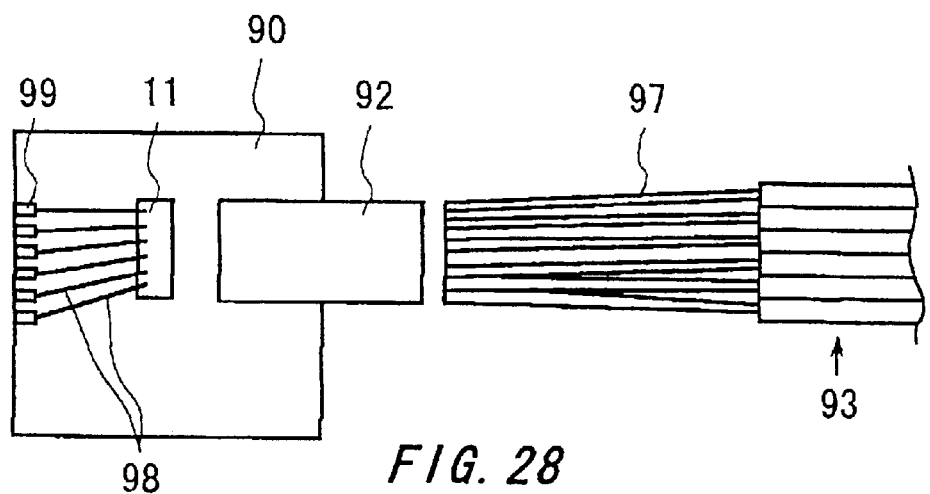
FIG. 28 shows the wires of the semiconductor laser according to the third embodiment.

FIG. 28 shows the wires of the semiconductor laser 11 to be optically coupled with the tape fiber 93. The semiconductor laser 11 installed on the substrate 90 is connected to electrodes 99 via wires 98. Since the semiconductor laser 11 has multiple light emitting units, the same number of wires 98 and the same number of electrodes 99 are installed corresponding to the multiple light emitting units. In reality, it is difficult to reduce the separation distance of the electrodes 99 down to the same separation distance of the light emitting units of the semiconductor laser 11. Therefore, the length of each of the wires 98 differs from one channel to another. As described in FIG. 28, the lengths of the cores 97 of the wires that constitute the tape fiber 93 differ from each other since they are pushed toward one end. That is, the lengths of the fibers differ from one channel to another.

The length of time required to send a signal through a wire is proportional to the length of the wire. Therefore, when high frequency signals are transmitted through the channels, even if the signals are sent out simultaneously to all the channels, temporal delays (skews) are generated between the channels due to the length differences between the wires of the channels. This problem is solved as follows. Note that the lengths of the cores 97 shown in FIG. 27 increase monotonically from the top core to the bottom core. On the other hand, the lengths of the wires 98 shown in FIG. 28 also increase monotonically from the top wire to the bottom wire. Therefore, the cores 97 shown in FIG. 27 are flipped. The flipped cores 97 are shown in FIG. 28. As a result, the lengths of the cores 97 shown in FIG. 28 decrease monotonically from the top core to the bottom core. Hence, the tape fiber 93, image fiber 92, semiconductor laser 11, and electrodes 99 are arranged as follows. The wires and cores for the channels are arranged so that the longest one of the cores 97 corresponds to the shortest one of the wires 98, the second longest one of the cores 97 corresponds to the second shortest one of the wires 98, . . . , and the shortest one of the cores 97 corresponds to the longest one of the wires 98. In this way, the monotonically decreasing lengths of the top one through bottom one of the cores 97 are matched with the monotonically increasing lengths of the top one through bottom one of the wires 98. Thus, the skews that would otherwise be generated by the differences in the wire lengths and core lengths are eliminated.

Figure 29:
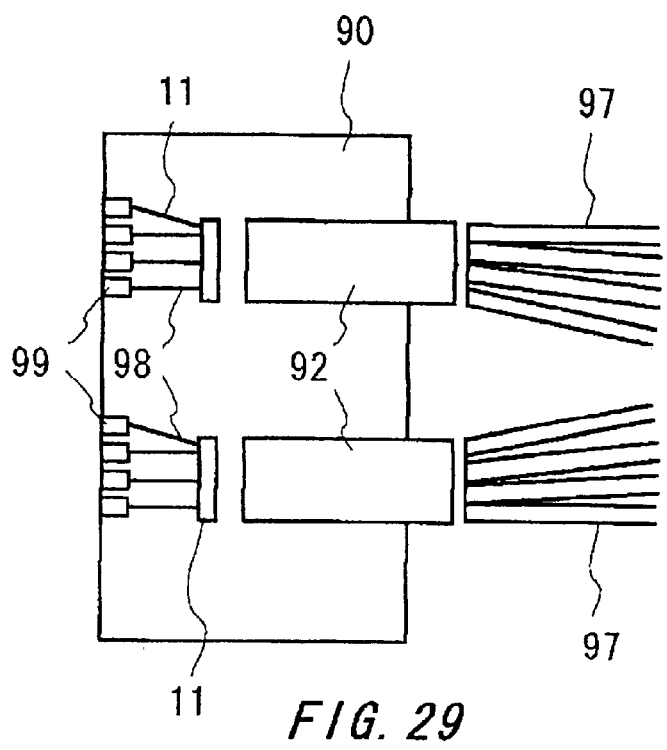
FIG. 29 shows the wires of the optical coupling module and tape fibers according to the variation of the third embodiment of the present invention.

The case in which such a wiring method is applied to a variation of the case shown in FIG. 28 will be explained. That is, as shown in FIG. 29, an even number of configurations each of which is identical to the one shown in FIG. 28 are installed on the substrate 90 so that any adjacent ones are mirror images of each other. In the configuration shown in FIG. 28, the optical coupling module 3b must be connected to the optical connector 4b carefully with the correct orientation so that the longest one of the wires 97 will correspond to the shortest one of the cores 97. Otherwise, skews are created between the channels. However, when an even number of semiconductor lasers and the same even number of optical fibers are arranged as shown in FIG. 29, the orientation of the optical coupling module 3b with respect to the optical connector 4b is invariant with respect to a flip. Therefore, the optical coupling module 3b can be connected to the optical connector 4b without paying attention to the orientation.

Figure 30:
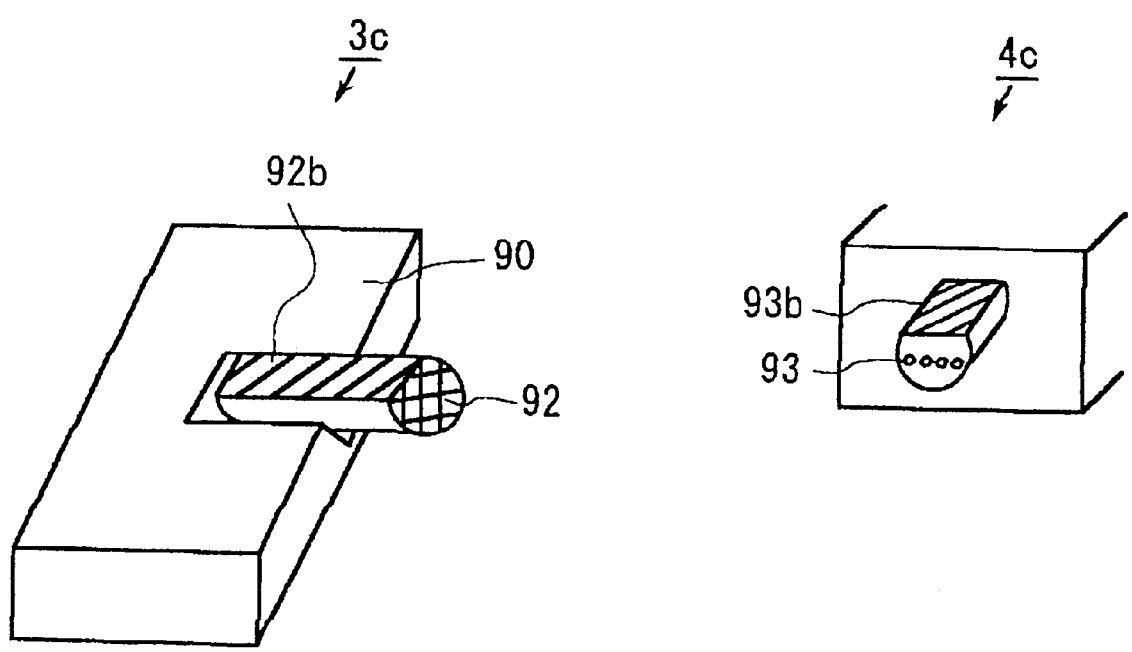
FIG. 30 is an oblique view of an optical coupling module and an optical connector according to another variation of the third embodiment of the present invention.

FIG. 30 is an oblique view of an optical coupling module 3c and an optical connector 4c according to another variation of the third embodiment of the present invention. In this variation of the third embodiment, a portion of the image fiber 92 is removed to create a notched portion 92b. This notched portion 92b is created by forming a flat surface in parallel along the longitudinal direction of the image fiber 92. When thus formed image-fiber 92 having the flat notched portion 92b is fixed on the V-shaped groove 91, the flat notched portion 92b is made parallel to the surface of the substrate 90. Such a notched portion 93b may be formed on the circumference of the tape fiber 93 also.

When the image fiber 92 is connected to the tape fiber 93, they are positioned using the notched portion 92b as a guide. The image fiber 92 is then coupled with the tape fiber 93. Specifically, when such a notched portion is formed on both the tape fiber 93 and image fiber 92, the distance between the center of the image fiber 92 and the notched portion 92b is made equal to the distance between the center of the tape fiber 93 and the notched portion 93b. Thus, the height of the notched portion 92b becomes equal to that of the notched portion 93b. Alternatively, the notched portion 92b may be aligned with the notched portion 93b using a split sleeve. In this way, the optical axes of the light beams that pass through the image fiber 92 are aligned with the corresponding centers of the cores of the wires of the tape fiber 93.

According to the configuration of this variation of the third embodiment, simply by matching the image fiber 92 with the tape fiber 93, the multiple light emitting points of the semiconductor laser 11 can be easily aligned horizontally with the corresponding wires of the tape fiber 93. Moreover, in this variation of the third embodiment, the partially cylindrical image fiber 92 can be fixed on the V-shaped groove 91 as follows. The notched portion 92b can be adsorbed using an adsorption collet in performing a die-bonding process. The notched portion 92b is then fixed on the V-shaped groove 91. Therefore, the operation efficiency is also improved.

Hence, according to the optical coupling module 3 of this third embodiment, the optical coupling module 3 can be easily aligned with the optical connector 4 when they are connected to each other.

What is claimed is:

1. An optical coupling module comprising:
   a substrate having a mounting surface;
   a plurality of light emitting devices fixed on said mounting surface of said substrate, said light emitting devices being operable to emit light in a first direction substantially parallel to said mounting surface of said substrate;
   a fiber optical plate fixed on said mounting surface of said substrate, said fiber optical plate including a plurality of first optical fibers, each of said first optical fibers being arranged along said first direction so as to receive the light emitted by said light emitting devices; and
   a fiber ribbon fixed on said mounting surface of said substrate, said fiber ribbon including a plurality of second optical fibers, each of said second optical fibers being arranged along said first direction so as to receive the light emitted by said light emitting devices through said first optical fibers.

2. An optical coupling module as claimed in claim 1, wherein a diameter of each of said first optical fibers is smaller than a diameter of each of said second optical fibers.

3. An optical coupling module as claimed in claim 1, wherein said light emitting devices are spaced apart from each other at a predetermined interval.

4. An optical coupling module as claimed in claim 3, wherein said second optical fibers are spaced apart from each other at said predetermined interval.

5. An optical coupling module as claimed in claim 1, wherein said first optical fibers are bundled together.

6. An optical coupling module as claimed in claim 1, wherein said substrate has an alignment mark for positioning and fixing said light emitting devices on said mounting surface of said substrate.

7. An optical coupling module as claimed in claim 1, wherein said substrate has a groove, said fiber optical plate being fixed in said groove.

8. An optical coupling module as claimed in claim 1, wherein said fiber optical plate is located between said plurality of light emitting devices and said fiber ribbon.

9. An optical coupling module comprising:
   a substrate having a mounting surface and having a plurality of grooves formed in said mounting surface;
   a plurality of light emitting devices fixed on said mounting surface of said substrate, said light emitting devices being operable to emit light in a first direction substantially parallel to said mounting surface of said substrate;
   a fiber optical plate fixed on said mounting surface of said substrate, said fiber optical plate including a plurality of first optical fibers, each of said first optical fibers being arranged along said first direction so as to receive the light emitted by said light emitting devices; and
   a plurality of second optical fibers fixed in said grooves formed in said mounting surface of said substrate, each of said second optical fibers being arranged along said first direction so as to receive the light emitted by said light emitting devices through said first optical fibers.

10. An optical coupling module as claimed in claim 9, wherein a diameter of each of said first optical fibers is smaller than a diameter of each of said second optical fibers.

11. An optical coupling module as claimed in claim 9, wherein said light emitting devices are spaced apart at from each other at a predetermined interval.

12. An optical coupling module as claimed in claim 11, wherein said second optical fibers are spaced apart from each other at said predetermined interval.

13. An optical coupling module as claimed in claim 9, wherein said first optical fibers are bundled together.

14. An optical coupling module as claimed in claim 9, wherein said substrate has an alignment mark for positioning and fixing said light emitting devices on said mounting surface of said substrate.

15. An optical coupling module as claimed in claim 9, wherein said substrate has a groove, said fiber optical plate being fixed in said groove.

16. An optical coupling module as claimed in claim 9, wherein said substrate has a tapered portion, said second optical fibers being fixed at said tapered portion.

17. An optical coupling module as claimed in claim 9, wherein said fiber optical plate is located between said plurality of light emitting devices and said plurality of second optical fibers.

18. An optical coupling module comprising:
   a substrate having a mounting surface;
   a plurality of light emitting devices fixed on said mounting surface of said substrate at a predetermined pitch, said light emitting devices being operable to emit light in a first direction;
   a fiber optical plate fixed on said mounting surface of said substrate, said fiber optical plate including a plurality of first optical fibers, each of said first optical fibers being arranged along said first direction so as to receive the light from said light emitting devices; and a fiber ribbon fixed on said mounting surface of said substrate, said fiber ribbon including a plurality of second optical fibers arranged at said predetermined pitch, each of said second optical fibers being arranged along said first direction so as to receive the light from said light emitting devices through said first optical fibers.

19. An optical coupling module as claimed in claim 8, wherein a diameter of each of said first optical fibers is smaller than a diameter of each of said second optical fibers.

20. An optical coupling module as claimed in claim 8, wherein said first optical fibers are bundled together.

21. An optical coupling module as claimed in claim 8, wherein said substrate has an alignment mark for positioning and fixing said light emitting devices.

22. An optical coupling module as claimed in claim 8, wherein said substrate has a groove, said optical plate being fixed in said groove.

23. An optical coupling module as claimed in claim 8, wherein said fiber optical plate is located between said plurality of light emitting devices and said fiber ribbon.

* * * * *